United States Patent
Kuno

(10) Patent No.: US 9,914,370 B2
(45) Date of Patent: Mar. 13, 2018

(54) VEHICLE SEAT

(71) Applicant: TOYOTA BOSHOKU KABUSHIKI KAISHA, Aichi-ken (JP)

(72) Inventor: Satoru Kuno, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 56 days.

(21) Appl. No.: 14/299,121

(22) Filed: Jun. 9, 2014

(65) Prior Publication Data

US 2014/0361592 A1    Dec. 11, 2014

(30) Foreign Application Priority Data

Jun. 10, 2013 (JP) ................................ 2013-121920
May 23, 2014 (JP) ................................ 2014-106937

(51) Int. Cl.
*B60N 2/04* (2006.01)
*B60N 2/06* (2006.01)
(Continued)

(52) U.S. Cl.
CPC ............. *B60N 2/045* (2013.01); *B60N 2/06* (2013.01); *B60N 2/0745* (2013.01);
(Continued)

(58) Field of Classification Search
USPC ............................. 297/344.17, 344.15, 325
See application file for complete search history.

(56) References Cited

U.S. PATENT DOCUMENTS 1,879,037 A * 9/1932 Bell .................... B61D 33/0085
                                                         248/425
1,880,497 A * 10/1932 Saunders ................. B60N 2/10
                                                         297/313

(Continued)

FOREIGN PATENT DOCUMENTS

| CN | 101274599 | 10/2008 |
|----|-----------|---------|
| CN | 102371915 | 3/2012  |

(Continued)

OTHER PUBLICATIONS

U.S. Appl. No. 14/299,107 to Satoru Kuno, filed Jun. 9, 2014.
(Continued)

*Primary Examiner* — Joshua J Michener
*Assistant Examiner* — Kyle J. Walraed-Sullivan
(74) *Attorney, Agent, or Firm* — Greenblum & Bernstein, P.L.C.

(57) ABSTRACT

A vehicle seat including: a connection mechanism; a seat cushion connected to an interior structure of a vehicle via the connection mechanism and configured to be displaced between a first state and a second state at which the seat cushion is arranged at a position closer to a front part-side of the vehicle than at the first state; and a seat back, wherein a sitting surface of the seat cushion at the first state gradually inclines upwardly from the rear of the seat towards the front of the seat, and wherein the connection mechanism is configured to displace the seat cushion to the second state and move a front part-side of the seat cushion more downwardly than at the first state, whereby the sitting surface of the seat cushion is made more horizontal at the second state than at the first state.

2 Claims, 15 Drawing Sheets

(51) Int. Cl.
   *B60N 2/07*  (2006.01)
   *B60N 2/16*  (2006.01)
   *B60N 2/18*  (2006.01)
   *B60N 2/02*  (2006.01)

(52) U.S. Cl.
   CPC ......... *B60N 2/1695* (2013.01); *B60N 2/1814* (2013.01); *B60N 2/1825* (2013.01); *B60N 2/1828* (2013.01); *B60N 2002/0216* (2013.01)

(56) References Cited

U.S. PATENT DOCUMENTS

| | | | | |
|---|---|---|---|---|
| 1,938,435 | A * | 12/1933 | MacAllister | B60N 2/10 248/393 |
| 3,596,982 | A * | 8/1971 | Grams | A61G 15/02 297/330 |
| 4,046,349 | A * | 9/1977 | MacAfee | B60N 2/045 248/424 |
| 4,572,468 | A * | 2/1986 | Lange | B60N 2/1615 248/394 |
| 4,720,143 | A * | 1/1988 | Schwartz | B60N 2/10 296/65.06 |
| 4,993,777 | A * | 2/1991 | LaPointe | A61G 5/14 297/325 |
| 5,022,707 | A * | 6/1991 | Beauvais | B60N 2/4214 248/371 |
| 5,449,218 | A * | 9/1995 | Beauvais | B60N 2/4214 297/216.19 |
| 5,730,492 | A * | 3/1998 | Warrick | B60N 2/4221 297/216.2 |
| 5,782,533 | A * | 7/1998 | Fischer | B60N 2/06 248/421 |
| 5,882,061 | A * | 3/1999 | Guillouet | B60N 2/1615 248/421 |
| 5,979,985 | A * | 11/1999 | Bauer | B60N 2/1615 297/322 |
| 6,036,266 | A * | 3/2000 | Massara | B60N 2/10 297/321 |
| 6,533,351 | B2 * | 3/2003 | Deptolla | B60N 2/4221 297/216.1 |
| 6,557,940 | B2 * | 5/2003 | Hayashi | A61G 5/14 297/330 |
| 6,637,818 | B2 * | 10/2003 | Williams | A61G 5/14 297/330 |
| 6,851,753 | B2 * | 2/2005 | Akaike | B60N 2/1615 248/421 |
| 6,921,058 | B2 * | 7/2005 | Becker | B60N 3/16 248/370 |
| 6,966,598 | B2 * | 11/2005 | Schmale | B60N 2/045 296/65.05 |
| 7,240,965 | B2 * | 7/2007 | Messerschmidt | B60N 2/06 297/325 |
| 7,413,232 | B1 * | 8/2008 | Fukui | B60N 2/245 296/65.09 |
| 7,413,252 | B2 * | 8/2008 | Kim | B60N 2/165 297/344.15 |
| 7,766,427 | B2 * | 8/2010 | Kojima | B60N 2/06 248/423 |
| 7,770,863 | B2 * | 8/2010 | Yamada | B60N 2/165 248/419 |
| 7,861,994 | B2 * | 1/2011 | Yamada | B60N 2/1615 248/421 |
| 7,918,501 | B1 * | 4/2011 | Hanson | B60N 2/4221 297/216.2 |
| 7,984,950 | B2 * | 7/2011 | Hoshi | B60N 2/1615 297/344.1 |
| 8,029,062 | B2 * | 10/2011 | Appelqvist | B60N 2/10 297/325 |
| 8,047,596 | B2 * | 11/2011 | Jungert | B60N 2/0232 296/65.05 |
| 8,172,326 | B2 * | 5/2012 | Adragna | B60N 2/1615 297/344.15 |
| 8,215,710 | B2 * | 7/2012 | Erker | A47C 1/03255 297/300.2 |
| 8,276,868 | B2 * | 10/2012 | Chang | A47C 9/002 248/157 |
| 8,596,721 | B2 * | 12/2013 | Ozawa | B60N 2/1615 248/421 |
| 8,616,636 | B2 * | 12/2013 | Arata | B60N 2/1615 297/216.1 |
| 8,616,645 | B2 * | 12/2013 | Ito | B60N 2/1615 297/344.15 |
| 2004/0066077 | A1 * | 4/2004 | Petry | B60N 2/1615 297/367 R |
| 2004/0075322 | A1 * | 4/2004 | Jaeger | B60N 2/0224 297/325 |
| 2006/0061176 | A1 * | 3/2006 | Sakai | B60N 2/1615 297/344.15 |
| 2007/0063565 | A1 * | 3/2007 | Habedank | B60N 2/123 297/341 |
| 2007/0194613 | A1 * | 8/2007 | Kojima | B60N 2/0705 297/344.15 |
| 2008/0007104 | A1 * | 1/2008 | Yokota | B60N 2/1615 297/344.15 |
| 2008/0048477 | A1 * | 2/2008 | Ujimoto | B60N 2/045 297/344.1 |
| 2008/0224519 | A1 * | 9/2008 | Ventura | B60N 2/06 297/313 |
| 2008/0309136 | A1 | 12/2008 | Kojima et al. | |
| 2009/0242700 | A1 * | 10/2009 | Raymond | B60N 2/1695 244/118.6 |
| 2009/0309383 | A1 * | 12/2009 | Teufel | B60N 2/045 296/65.13 |
| 2010/0001569 | A1 * | 1/2010 | Shinozaki | B60N 2/1615 297/344.15 |
| 2010/0127544 | A1 * | 5/2010 | Panchbhaya | A61G 5/1075 297/325 |
| 2010/0148532 | A1 * | 6/2010 | Jungert | B60N 2/0232 296/65.18 |
| 2010/0253110 | A1 * | 10/2010 | Yamada | B60N 2/161 296/65.08 |
| 2011/0227378 | A1 * | 9/2011 | Swierczewski | B60N 2/06 297/216.15 |
| 2011/0272988 | A1 * | 11/2011 | Schuler | B60N 2/1615 297/354.12 |
| 2012/0007401 | A1 * | 1/2012 | Hashimoto | B60N 2/0232 297/344.13 |
| 2012/0032057 | A1 * | 2/2012 | Ito | B60N 2/1615 248/421 |
| 2012/0043797 | A1 | 2/2012 | Fischbein | |
| 2012/0074743 | A1 * | 3/2012 | Asakura | B60N 2/1615 297/216.1 |
| 2012/0212014 | A1 * | 8/2012 | Arata | B60N 2/165 297/216.1 |
| 2012/0212015 | A1 * | 8/2012 | Ozawa | B60N 2/165 297/216.1 |
| 2013/0200675 | A1 * | 8/2013 | Beneker | B60N 2/0228 297/325 |
| 2013/0200677 | A1 * | 8/2013 | Hoshi | B60N 2/1615 297/344.15 |
| 2013/0300164 | A1 * | 11/2013 | Jonsson | B60N 2/42727 297/216.1 |
| 2013/0307301 | A1 * | 11/2013 | Munemura | B60N 2/4228 297/216.13 |
| 2015/0130240 | A1 * | 5/2015 | Hozumi | B60N 2/0244 297/340 |

FOREIGN PATENT DOCUMENTS

| | | |
|---|---|---|
| JP | 60-16625 | 2/1985 |
| JP | 60-92629 | 6/1985 |
| JP | 62-110037 | 7/1987 |
| JP | 3-122925 | 12/1991 |
| JP | 2010-51502 | 3/2010 |
| JP | 2012-158201 | 8/2012 |
| JP | 2013-107486 | 6/2013 |

(56) References Cited

FOREIGN PATENT DOCUMENTS

OTHER PUBLICATIONS

Chinese Office Action for CN App. No. 201410256277.0 dated Jan. 12, 2016, along with English-language translation thereof.
Chinese Office Action for CN App. No. 201410256277.0 dated Feb. 15, 2017, along with English-language translation thereof.
Japanese Office Action for JP App. No. 2014-106937 dated Jul. 4, 2017, along with English-language translation thereof.

* cited by examiner

VEHICLE SEAT

CROSS-REFERENCE TO RELATED APPLICATIONS

This application claims priority from Japanese Patent Application No. 2013-121920 filed on Jun. 10, 2013, and Japanese Patent Application No. 2014-106937 filed on May 23, 2014, the entire contents of which are incorporated herein by reference.

TECHNICAL FIELD

The invention relates to a vehicle seat moveable inside a vehicle interior.

BACKGROUND

As this type of vehicle seat, a vehicle seat having a seat cushion, a seat back erecting from the seat cushion and a connection mechanism (a seat rail and a slide rail) has been known (see JP-A-2012-158201).

In the related-art technology, the seat rail is mounted on a floor surface at a rear-side of an instrument panel and extends in a longitudinal direction of the vehicle interior. At this state, the slide rail at a lower part of the seat cushion is mounted to the seat rail, so that the vehicle seat is mounted to be slidable on the floor surface while facing the instrument panel. As for a large passenger, the vehicle seat is slid rearwards and is thus spaced from the instrument panel. Also, as for a small passenger, the vehicle seat is slid forwards and is thus made to come close to the instrument panel.

In this type of seat configuration, it is preferable to adapt an angle of a sitting surface of the seat cushion to a bent shape of leg parts of a passenger, considering the sitting comfort of the seat.

For example, upon the sitting, the leg parts of the passenger are bent into a substantially inverted V shape, where the femoral regions face upwards, are bent downwardly at knee parts and extend towards the lower of the instrument panel (a pedal).

Thus, the sitting surface of the seat cushion is made to be gradually inclined upwardly from the rear of the seat towards the front of the seat, in conformity to a large passenger, for example. In this way, the large passenger can sit while naturally bending the leg parts.

According to the above related-art technology, the vehicle seat is moved forwards and rearwards with the angle of the sitting surface being fixed. For this reason, the sitting comfort may be deteriorated when the vehicle seat is slid forwards in conformity to a small passenger.

That is, the small passenger cannot bring a foot into contact with the pedal unless the inclined angle of the femoral region is made to be gentler than the large passenger. For this reason, when the angle of the sitting surface of the seat cushion is made to adapt to the large passenger, the small passenger sits on the seat while strongly pressing the femoral region on the sitting surface (the interference with the sitting surface is large).

The angle of the sitting surface can be made to be gentle in conformity to the small passenger. However, in this case, the sitting comfort for the large passenger will be degraded (for example, a gap is generated between the femoral regions and the sitting surface). At this time, the seat may be further moved rearwards to adapt the bending degrees of the leg parts of the large passenger to those of the small passenger. However, the rearward movement is limited due to an interior space.

SUMMARY

According to the related-art technology (the angle of the sitting surface is fixed), the angle of the sitting surface of the seat cushion is typically set in conformity to an average body size of the passenger so as to correct the above problems. However, in this case, the angle of the sitting surface is not optimal for both the large passenger and the small passenger, so that the sitting comfort is deteriorated for both passengers.

The invention has been made keeping in mind the above situations, and an object of the invention is to effectively change an angle of a sitting surface of a seat cushion in conformity to a state displacement of a vehicle seat.

According to an aspect of the invention, there is provided a vehicle seat including: a connection mechanism; a seat cushion connected to an interior structure of a vehicle via the connection mechanism and configured to be displaced between: a first state; and a second state at which the seat cushion is arranged at a position closer to a front part-side of the vehicle than at the first state; and a seat back erectably connected to the seat cushion, wherein a sitting surface of the seat cushion at the first state gradually inclines upwardly from the rear of the seat towards the front of the seat, and wherein the connection mechanism is configured to displace the seat cushion to the second state and move a front part-side of the seat cushion more downwardly than at the first state, whereby the sitting surface of the seat cushion is made more horizontal at the second state than at the first state.

Accordingly, at the first state, the sitting surface is gradually inclined upwardly from the rear of the seat towards the front of the seat by the connection mechanism. Thereby, it is possible to adapt an angle of the sitting surface at the first state to a relatively large passenger. Also, at the second state, the sitting surface is made more horizontal than at the first state. Thereby, it is possible to adapt the angle of the sitting surface at the second state to a relatively small passenger.

Accordingly, it is possible to effectively change an angle of a sitting surface of a seat cushion in conformity to a state displacement of a vehicle seat.

BRIEF DESCRIPTION OF DRAWINGS

FIGS. 5A and 5B are schematic side views of a vehicle seat according to a third illustrative embodiment, in which FIG. 5A illustrates the vehicle seat at the first state and FIG. 5B illustrates the vehicle seat at the second state;

FIGS. 6A and 6B are schematic side views of a vehicle seat according to a fourth illustrative embodiment, in which FIG. 6A illustrates the vehicle seat at the first state and FIG. 6B illustrates the vehicle seat at the second state;

FIGS. 7A and 7B are schematic side views of a vehicle seat according to a fifth illustrative embodiment, in which FIG. 7A illustrates the vehicle seat at the first state and FIG. 7B illustrates the vehicle seat at the second state;

FIGS. 8A and 8B are schematic side views of a vehicle seat according to a sixth illustrative embodiment, in which FIG. 8A illustrates the vehicle seat at the first state and FIG. 8B illustrates the vehicle seat at the second state;

FIGS. 9A and 9B are schematic side views of a vehicle seat according to a seventh illustrative embodiment, in which FIG. 9A illustrates the vehicle seat at the first state and FIG. 9B illustrates the vehicle seat at the second state;

FIGS. 10A and 10B are schematic side views of a vehicle seat according to an eighth illustrative embodiment, in which FIG. 10A illustrates a first state and FIG. 10B illustrates a second state;

FIGS. 11A and 11B are schematic side views of a vehicle seat according to a ninth illustrative embodiment, in which FIG. 11A illustrates a first state and FIG. 11B illustrates a second state;

FIGS. 12A, 12B and 12C are schematic side views of a vehicle seat according to a tenth illustrative embodiment, in which FIG. 12A illustrates a first state, FIG. 12B illustrates a second state and FIG. 12C illustrates a state of an intermediate position between the first state and the second state;

DETAILED DESCRIPTION

Hereinafter, illustrative embodiments for implementing the present invention will be described with reference to FIGS. 1 to 9. In the respective drawings, the front of a vehicle seat is denoted with a symbol F, the rear of the vehicle seat is denoted with a symbol B, the upper of the vehicle seat is denoted with a symbol UP and the lower of the vehicle seat is denoted with a symbol DW.

Figure 1:
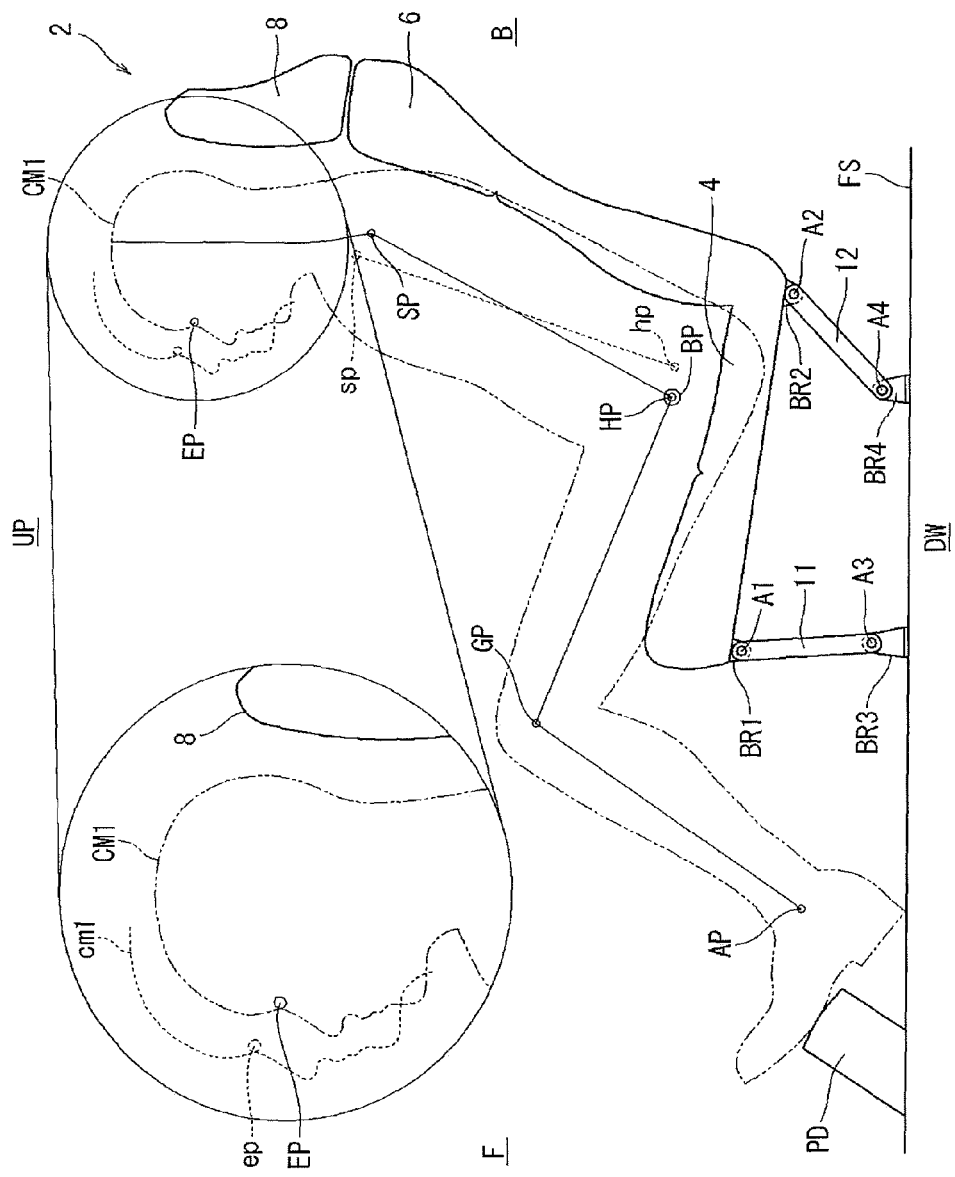
FIG. 1 is a schematic side view of a vehicle seat at a first state according to a first illustrative embodiment.

In this illustrative embodiment, a floor surface FS (a substantially flat floor surface), an instrument panel (not shown) and a vehicle seat 2 are provided in a vehicle interior (refer to FIG. 1). The instrument panel is arranged at a front part-side of a vehicle and a pedal PD is arranged at a lower side of the instrument panel.

The vehicle seat 2 has a seat structure member (a seat cushion 4, a seat back 6 and a headrest 8) and a connection mechanism, which will be described later. The seat back 6 is connected to a rear part of the seat cushion 4 so that it can be erected and laid down. Also, the headrest 8 is connected to an upper part of the seat back 6 in an erected state.

In this illustrative embodiment, the seat structure member 4, 6, 8 is arranged above the floor surface FS via the connection mechanism (which will be described in detail later) and is displaced between a first state and a second state (see to FIGS. 1 and 2). As for the vehicle seat 2 at the first state shown in FIG. 1, the seat structure member is moved to a rear part of the vehicle and is thus spaced from the instrument panel (which is an arrangement position suitable for a large passenger). Also, as for the vehicle seat 2 at the second state shown in FIG. 2, the seat structure member is moved more to a front part of the vehicle than at the first state and comes close to the instrument panel (which is an arrangement position suitable for a small passenger).

In the above-described seat configuration, it is preferable that an angle (which will be described in detail later) of a sitting surface of the seat cushion 4 can be changed depending on the respective states, in conformity to a body size difference of the passengers.

Thus, in this illustrative embodiment, the angle of the sitting surface of the seat cushion 4 at a horizontal state is adapted to an average body size of a passenger, and an angle of the sitting surface of the seat cushion is gradually inclined upwardly from the rear of the seat towards the front of the seat. Also, by a configuration to be described later, the angle of the sitting surface of the seat cushion 4 is effectively changed in conformity to the state displacement of the vehicle seat 2. Hereinafter, the respective configurations will be described in detail.

First Illustrative Embodiment

Figure 2:
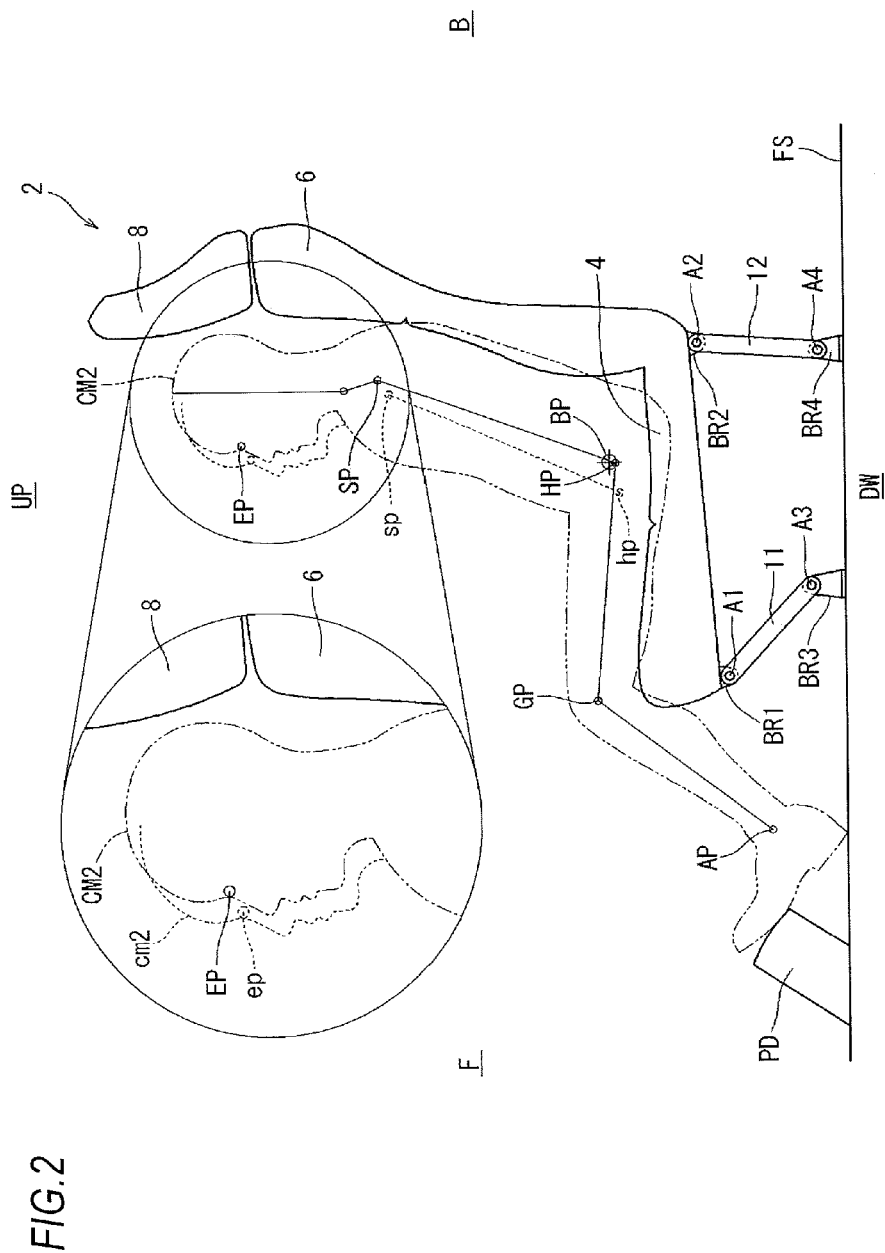
FIG. 2 is a schematic side view of the vehicle seat at a second state according to the first illustrative embodiment.

In this illustrative embodiment, the connection mechanism includes a first link arm 11, a second link arm 12 and a plurality of brackets BR1 to BR4 (see FIGS. 1 and 2).

The first link arm 11 and the second link arm 12 are flat plate members having an I shape (when seen from the side) and can be arranged between the seat cushion 4 and the floor surface FS. Also, the brackets BR1 to BR4 are members (typically, flat plates) to which end portions of the respective link arms can be rotatably attached.

In this illustrative embodiment, the first bracket BR1 is formed to protrude downwardly at a front end of a backside of the seat cushion 4 and the second bracket BR2 is formed to protrude downwardly at a rear end of the backside of the seat cushion 4.

Also, the third bracket BR3 is formed to protrude upwardly on the floor surface FS and is arranged to face the front part (the first bracket BR1) of the seat cushion 4 at the first state. Also, the fourth bracket BR4 is formed to protrude upwardly on the floor surface FS and is arranged to face the rear part (the second bracket BR2) of the seat cushion 4 at the second state.

In this illustrative embodiment, the seat structure member is arranged at the rear side of the instrument panel (the pedal PD) and the front part of the seat cushion 4 is connected to the floor surface FS via the first link arm 11.

At this time, an upper end of the first link arm 11 is rotatably attached to the first bracket BR1 via a rotational shaft A1 and a lower end of the first link arm 11 is rotatably attached to the third bracket BR3 via a rotational shaft A3. In this illustrative embodiment, at the first state, the first link arm 11 is erected substantially vertically from the floor surface FS (an erected posture). The first link arm 11 is configured to be gradually tilted forwards (a posture gradually tilted forwards as the first arm faces upwards) as it is displaced from the first state to the second state.

Also, the rear part of the seat cushion 4 is connected to the floor surface FS via the second link arm 12.

At this time, an upper end of the second link arm 12 is rotatably attached to the second bracket BR2 via a rotational shaft A2 and a lower end of the second link arm 12 is rotatably attached to the fourth bracket BR4 via a rotational shaft A4. In this illustrative embodiment, at the first state, the second link arm 12 is tilted rearwards relative to the floor surface FS (a posture gradually tilted rearwards as the second link arm faces upwards). The second link arm 12 is configured to be gradually erected as it is displaced from the first state to the second state.

[Vehicle Seat at First State]

Referring to FIG. 1, the seat structure member is set at the first state and is arranged while being spaced from the instrument panel (a position suitable for a large passenger) by the connection mechanism.

At this time, in this illustrative embodiment, the first link arm 11 is erected and the second link arm 12 is tilted rearwards. At this state, the postures of both the link arms are kept by a lock mechanism (not shown), so that the seat structure member can be arranged while being spaced from the instrument panel (the first state).

Also, in this illustrative embodiment, the angle of the sitting surface of the seat cushion 4 is adapted to the larger passenger by the connection mechanism.

In this illustrative embodiment, as the first link arm 11 is erected, the front part of the seat cushion 4 is moved upwardly and the second link arm 12 is tilted rearwards, so that the rear part of the seat cushion 4 is moved downwardly (relatively downwardly). For this reason, the postures of both the link arms are displaced, so that the sitting surface of the seat cushion 4 can be made to be gradually inclined upwardly from the rear of the seat towards the front of the seat (the inclined angle is larger than the horizontal state), in conformity to the large passenger. Further, as the seat cushion 4 is inclined, the seat back 6 is somewhat inclined rearwards. Thereby, it is possible to enable the large passenger to sit with the upper half body of the passenger being somewhat inclined rearwards.

A first model CM1 (corresponding to AM 95 of the SAE standard) imitating the large passenger is prepared and is made to naturally sit on the vehicle seat 2.

At this time, the first model CM1 is enabled to sit so that an upper half body (a shoulder part SP) is slightly inclined rearwards and hips (hip points HP) are deeply buried at the rear part of the seat cushion 4. Leg parts of the first model CM1 are bent into a substantially inverted V shape, so that the femoral regions are inclined forwards and upwards from the hip points HP (seat reference points BP). Also, front parts of the femoral regions are bent forwards and downwards at knee parts GP and ankle parts AP extend towards the pedal. At this time, the femoral regions are arranged along the sitting surface of the seat cushion 4 and are appropriately put on the seat cushion 4 (i.e., it is possible to appropriately keep a relationship between the large passenger and the seat).

Also, the upper half body (the shoulder part SP) is slightly inclined rearwards and the hips (hip points HP) are deeply buried at the rear part of the seat cushion 4, so that it is possible to prevent positions of eye parts EP (eye lines) from getting higher beyond necessity.

Here, problems of the related art (where the angle of the sitting surface is fixed) at the first state are supplementary described.

In the related art, the angle of the sitting surface of the seat cushion 4 is set in conformity to an average body size of the passenger (for example, the angle is set to be an intermediate inclination angle of the first state and the second state in this illustrative embodiment).

In the configuration of the related art, the angle of the sitting surface of the seat cushion 4 at the first state is gentler than this illustrative embodiment and the seat back 6 is somewhat erected.

For this reason, according to the configuration of the related art, since it is necessary to avoid a separation between the femoral regions and the sitting surface as much as possible at the first state, the hip points hp of the first model cm1 (small letters are used to distinguish with the illustrative embodiment) are arranged at a somewhat rear part. At this state, since the first model cm1 sits on the seat cushion 4 with the upper half body (the shoulder part sp) being somewhat erected, the positions of the eye parts ep (eye lines) get higher more than necessary.

[Vehicle Seat at Second State]

The seat structure member is set at the second state and arranged to be close to the instrument panel (a position suitable for the small passenger) by the connection mechanism (refer to FIG. 2).

At this time, in this illustrative embodiment, the first link arm 11 is tilted forwards and the second link arm 12 is erected. At this state, the postures of both the link arms are kept by the lock mechanism (not shown), so that the seat structure member can be arranged to be close to the instrument panel (the second state).

Also, in this illustrative embodiment, the angle of the sitting surface of the seat cushion 4 is adapted to the small passenger by the connection mechanism.

In this illustrative embodiment, as the first link arm 11 is tilted forwards, the front part of the seat cushion 4 is moved downwardly, and as the second link arm 12 is erected, the rear part of the seat cushion 4 is moved upwardly (relatively upwardly). In this way, the postures of both the link arms are displaced, so that it is possible to set the angle of the sitting surface of the seat cushion 4 at a more horizontal state than the first state, in conformity to the small passenger. Also, as the seat cushion 4 is made more horizontal, the seat back 6 is more erected than the first state. Thereby, the small passenger can sit with erecting the upper half body.

A second model CM2 (corresponding to JF 05 of the SAE standard) imitating the small passenger is prepared and is made to naturally sit on the vehicle seat 2.

At this time, the second model CM2 is enabled to sit so that an upper half body (a shoulder part SP) is erected and hips (hip points HP) are lightly buried at the rear part of the seat cushion 4. The femoral regions are inclined (more gently inclined than the first model CM1) forwards and upwards from the hip points HP (located slightly below the seat reference points BP). At this time, the femoral regions are arranged along the relatively horizontal sitting surface of the seat cushion 4 and is appropriately buried into the seat cushion 4 (i.e., it is possible to appropriately keep a relationship between the small passenger and the seat).

Also, the upper half body (the shoulder part SP) is erected and the hips are lightly buried at the rear part of the seat cushion 4, so that it is possible to prevent positions of the eye parts EP (eye lines) from getting lower beyond necessity.

Here, problems of the related art (where the angle of the sitting surface is fixed) at the second state are supplementary described.

In the related art, as described above, the angle of the sitting surface of the seat cushion 4 is set in conformity to an average body size of the passenger, so that the angle of the sitting surface at the second state is steeper than this illustrative embodiment.

In the configuration of the related art, in order to avoid excessive interference between the femoral regions and the sitting surface at the second state, the second model cm2 sits at a somewhat shallow state (the hip points hp are located at a somewhat front part). For this reason, since the second model cm2 sits with the upper half body (the shoulder part sp) being somewhat inclined rearwards, the positions of the eye parts ep (eye lines) get lower more than necessary.

As described above, in this illustrative embodiment, the sitting surface of the seat cushion 4 at the first state is gradually inclined upwards from the rear of the seat towards the front of the seat and thus can adapt to the relatively large passenger. Also, the sitting surface of the seat cushion 4 at the second state is made to be more horizontal than at the first state and thus can adapt to the relatively small passenger.

Therefore, according to this illustrative embodiment, it is possible to effectively change the angle of the sitting surface of the seat cushion 4 in conformity to the state displacement of the vehicle seat 2.

Second Illustrative Embodiment

In this illustrative embodiment, a vehicle seat 2A has substantially the same basic configuration as the vehicle seat 2 of the first illustrative embodiment. Therefore, the common structures are denoted with the same reference numerals and the specific descriptions thereof are omitted.

Figure 3:
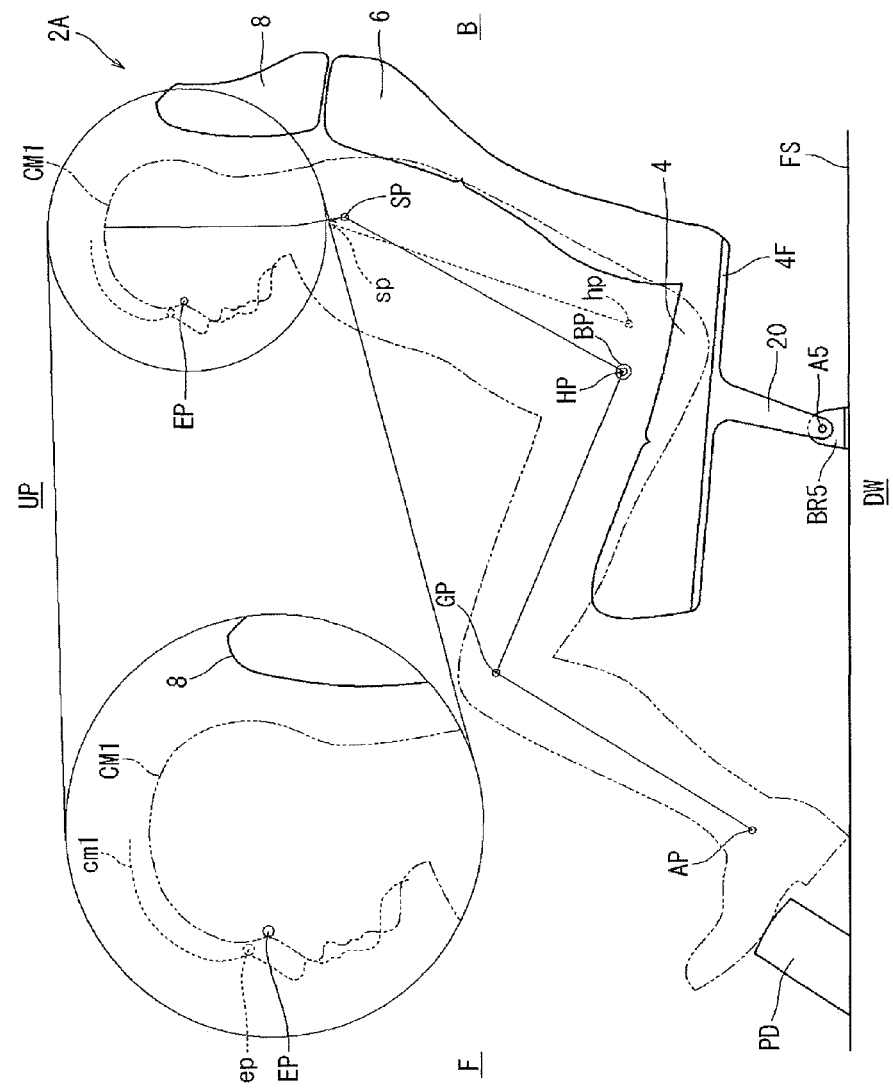
FIG. 3 is a schematic side view of a vehicle seat at the first state according to a second illustrative embodiment.
Figure 4:
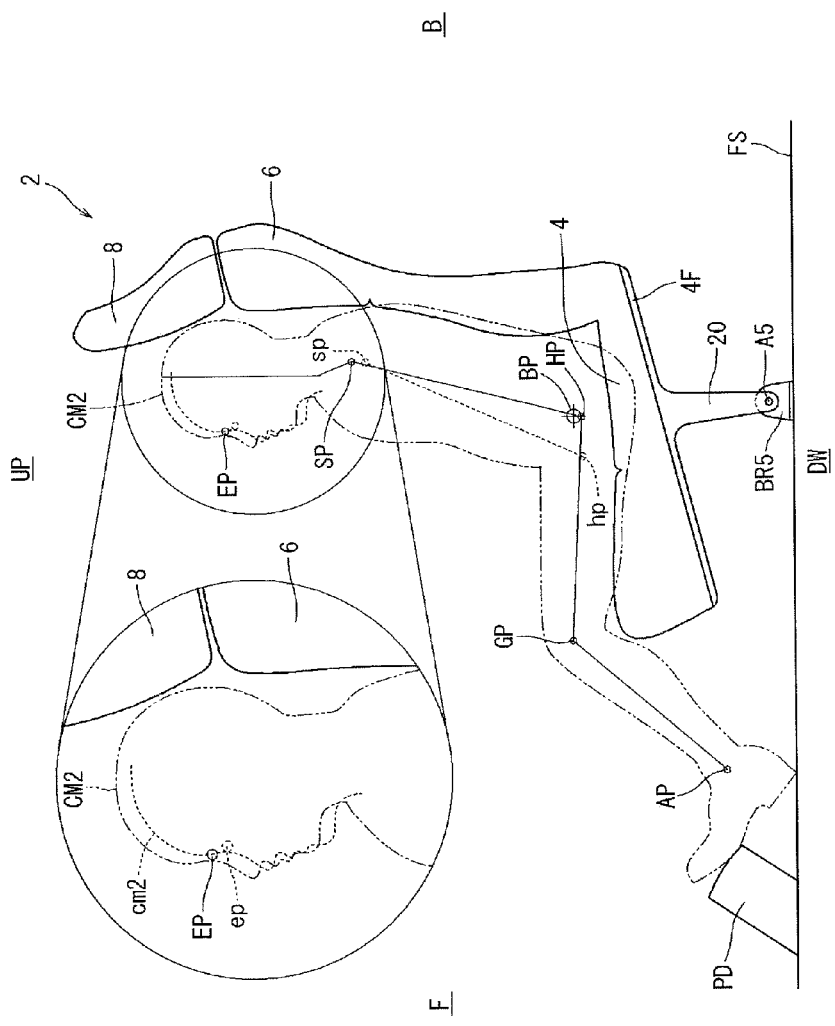
FIG. 4 is a schematic side view of the vehicle seat at the second state according to the second illustrative embodiment.

In this illustrative embodiment, the connection mechanism includes an arm part 20 of the seat cushion 4 and a bracket BR5 (refer to FIGS. 3 and 4).

The arm part 20 is a flat plate-shaped part (having a substantial I shape, when seen from the side) and extends from a substantial center of the backside of the seat cushion 4 (a seat frame 4F) towards the floor surface FS. Also, the bracket BR5 is a flat plate member protruding from the floor surface FS and can rotatably attach an end portion of the arm part 20.

In this illustrative embodiment, the front part-side of the seat cushion 4 is arranged at a slightly higher position than the rear part-side and the seat structure member is arranged at the position of the first state. At this time, the arm part 20 is gradually inclined rearwards from the lower towards the upper (a rearward tilted posture) and a lower end of the arm part 20 is rotatably attached to the bracket BR5 via a rotational shaft A5. The arm part 20 is configured to be gradually erected as it is displaced from the first state to the second state.

Referring to FIG. 3, the arm part 20 is kept at the rearward tilted posture by the lock mechanism (not shown), so that the seat structure member is set at the first state. At this time, the sitting surface of the seat cushion 4 is gradually inclined upwards from the rear of the seat towards the front of the seat, in conformity to the large passenger (CM 1).

Then, referring to FIG. 4, the seat structure member is displaced from the first state to the second state by the connection mechanism. At this time, in this illustrative embodiment, the arm part 20 is rotated about the rotational shaft A5 (rotated in a pendulum form) and is thus erected. The arm part 20 is kept at the erected state by the lock mechanism (not shown), so that the seat structure member can be displaced to the second state. In this illustrative embodiment, as the arm part 20 is erected, the front part of the seat cushion 4 is inclined (moved) downwardly and the rear part of the seat cushion 4 is inclined (moved) upwardly. Therefore, it is possible to set the sitting surface of the seat cushion 4 at the more horizontal state than the first state, in conformity to the small passenger (CM2).

In this way, according to this illustrative embodiment, it is possible to effectively change the angle of the sitting surface of the seat cushion 4 in conformity to the state displacement of the vehicle seat 2A by the pendulum operation of the arm part 20 (a relatively simple configuration).

Third Illustrative Embodiment

In this illustrative embodiment, a vehicle seat 2B has substantially the same basic configuration as the vehicle seat 2 of the first illustrative embodiment. Therefore, the common structures are denoted with the same reference numerals and the specific descriptions thereof are omitted.

In this illustrative embodiment, the connection mechanism includes an upper rail 31, a lower rail 32 and a pedestal 34 (see FIG. 5). The lower rail 32 is a flat plate member having an arc-shaped upper part (a convexly curved shape, when seen from the side), and a front part-side thereof on the basis of a substantial center apex is gradually curved downwardly and a rear part-side thereof is gradually curved downwardly. Also, the upper rail 31 is a flat plate member slidably mounted to the lower rail 32, and a lower part thereof has an arc shape (a concavely curved shape, when seen from the side) conforming to the lower rail 32.

In this illustrative embodiment, the lower rail 32 is fixed to the floor surface FS via the pedestal 34, and the upper rail 31 is fixed to the backside (the substantial center) of the seat cushion 4 (the seat frame 4F) to thus face the lower rail 32. At this state, the upper rail 31 is slidably connected to the rear part-side of the lower rail 32 and the relative movement of the upper rail 31 and the lower rail 32 is restrained by the lock mechanism (not shown).

Figure 5A:
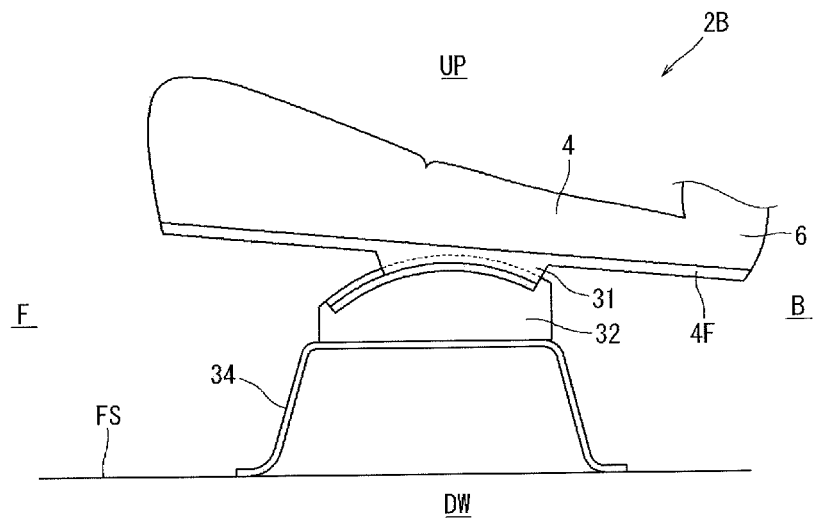

In this illustrative embodiment, at the first state, the upper rail 31 is arranged at a somewhat rearwards position from the apex of the lower rail 32 and the front part of the seat cushion 4 is arranged at a higher position than the rear part thereof (see FIG. 5A). In this way, the sitting surface of the seat cushion 4 can be gradually inclined upwardly from the rear of the seat towards the front of the seat, in conformity to the large passenger.

Figure 5B:
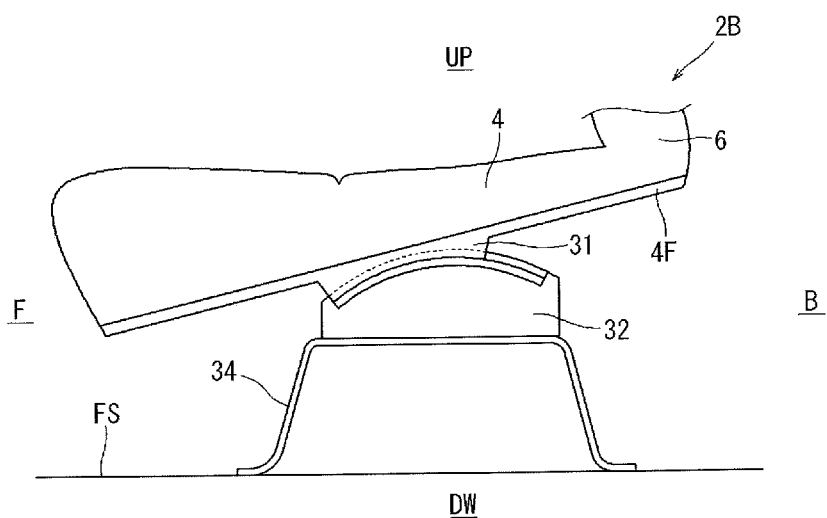

Then, the seat structure member is displaced from the first state to the second state by the connection mechanism (refer to FIG. 5B). At this time, in this illustrative embodiment, the upper rail 31 is moved towards the front part-side of the lower rail 32 together with the seat structure member and the relative movement of both the rails is restrained by the lock mechanism, so that the seat structure member is displaced to the second state.

In this illustrative embodiment, as the seat structure member is moved along the lower rail 32 (the curved shape), the front part of the seat cushion 4 is inclined (moved) downwardly and the rear part of the seat cushion 4 is inclined (moved) upwardly. Therefore, it is possible to set the sitting surface of the seat cushion 4 at a more horizontal state than at the first state, in conformity to the small passenger.

Thus, also in this illustrative embodiment, it is possible to effectively change the angle of the sitting surface of the seat cushion 4 in conformity to the state displacement of the vehicle seat 2B.

Fourth Illustrative Embodiment

In this illustrative embodiment, a vehicle seat 2C has substantially the same basic configuration as the vehicle seat 2 of the first illustrative embodiment. Therefore, the common structures are denoted with the same reference numerals and the specific descriptions thereof are omitted.

In this illustrative embodiment, the vehicle seat 2C is arranged on a step-shaped floor surface (a first floor surface FS1 at the front part-side of the vehicle and a second raised floor surface FS2 at the rear part-side of the vehicle) (see FIG. 6).

In this illustrative embodiment, the connection mechanism includes a link arm 41, a sixth bracket BR6 and a seventh bracket BR7 (having the same configuration as the bracket of the first illustrative embodiment), a connection part 42 and a slide mechanism 44, 46.

The link arm 41 is a relatively long I-shaped (when seen from the side) flat plate member. Also, the sixth bracket BR6 is formed to protrude from the backside of the front part of the seat cushion 4. The seventh bracket BR7 is formed to protrude from the first floor surface FS1 and is arranged to face the sixth bracket BR6 at the first state.

The connection part 42 is a (relatively short) flat plate part having a substantially rectangular shape and is formed to protrude downwardly from the backside (lopsided rearwards) of the seat cushion 4. The slide mechanism has a lower rail 46 (a linear flat plate member) fixed at the front part-side of the second floor surface FS2 and a slider 44 (a short flat plate member) slidable on the lower rail 46.

In this illustrative embodiment, at the first state, the seat structure member is arranged over the first floor surface FS1 and the second floor surface FS2. Thus, both sides of the front part of the seat cushion 4 are connected to the first floor surface FS1 via the link arm 41. At this time, an upper end of the link arm 41 is rotatably attached to the sixth bracket BR6 via a rotational shaft A6, and a lower end of the link arm 41 is rotatably attached to the seventh bracket BR7 via a rotational shaft A7. The link arm 41 is erected at the first state and is gradually tilted forwards as it is displaced to the second state.

Also, the rear part-side of the seat cushion 4 is connected to the second floor surface FS2 via the slide mechanism. At this time, the rear part-side (the connection part 42) of the seat cushion 4 is rotatably attached to the slider 44 via a rotational shaft A8, so that it can be slid on the lower rail 46.

Figure 6A:
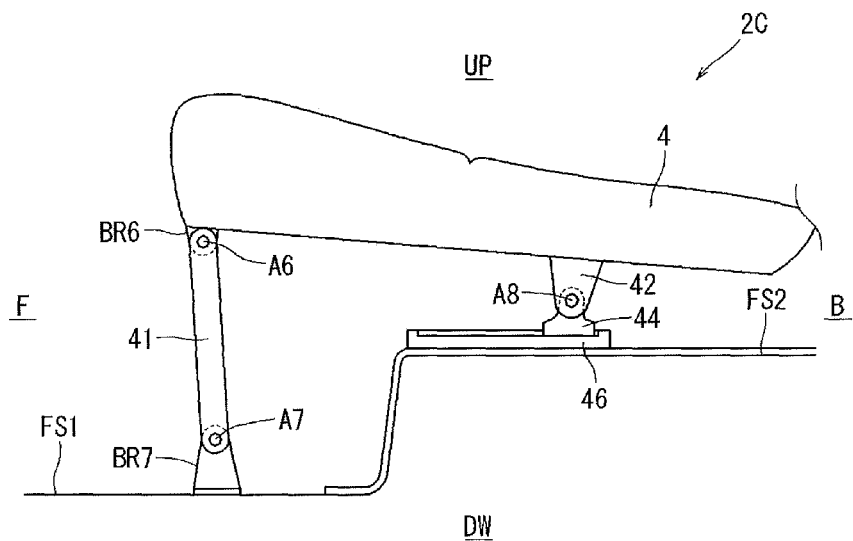

In this illustrative embodiment, at the first state, the link arm 41 is erected and the connection part 42 (the slider 44) is arranged at the rear part-side of the lower rail 46 (see FIG. 6A). At this state, the relative movement of the lower rail 46 and the slider 44 is restrained by the lock mechanism (not shown), so that the seat structure member can be kept at the first state.

Also, in this illustrative embodiment, at the first state, the link arm 41 is erected (the link arm 41 becomes higher than the slide mechanism and the connection part), so that the front part-side of the seat cushion 4 is arranged at a higher position than the rear part-side thereof. In this way, the sitting surface of the seat cushion 4 can be made to be gradually inclined upwardly from the rear of the seat towards the front of the seat, in conformity to the large passenger.

Figure 6B:
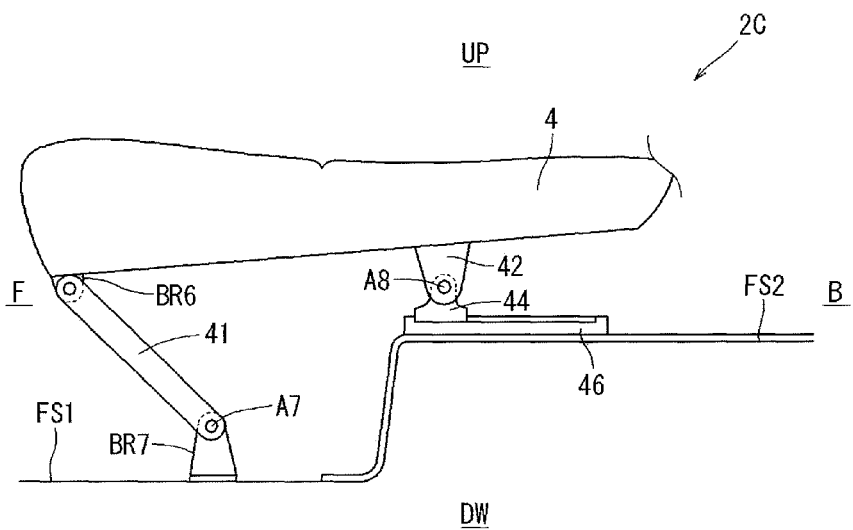

Also, the seat structure member is displaced from the first state to the second state by the connection mechanism (see FIG. 6B). At this time, in this illustrative embodiment, the link arm 41 is tilted forwards and the connection part 42 (the slider 44) is moved towards the front part of the lower rail 46. The relative movement of the lower rail 46 and the slider 44 is restrained to thus keep the seat structure member at the second state.

In this illustrative embodiment, the link arm 41 is tilted forwards and the seat cushion 4 is rotated about the rear part-side (the rotational shaft A8) serving as a center of rotation, so that the front part of the seat cushion 4 is inclined (moved) downwards, compared to the rear part thereof. In this way, it is possible to set the sitting surface of the seat cushion 4 at a more horizontal state than at the first state.

Therefore; also in this illustrative embodiment, it is possible to effectively change the angle of the sitting surface of the seat cushion 4 in conformity to the state displacement of the vehicle seat 2C.

Fifth Illustrative Embodiment

In this illustrative embodiment, a vehicle seat 2D has substantially the same basic configuration as the vehicle seat 2 of the first illustrative embodiment. Therefore, the common structures are denoted with the same reference numerals and the specific descriptions thereof are omitted.

In this illustrative embodiment, the connection mechanism includes a plurality of connection parts (a first connection part 51 and a second connection part 52), a support member 54, and a slide mechanism 56, 58 (see FIG. 7).

The first connection part 51 (the flat plate part) is formed to protrude downwardly from the backside (lopsided forwards) of the seat cushion 4, and the second connection part 52 (the flat plate part) is formed to protrude downwardly from the backside of the rear part of the seat cushion 4. Also, the slide mechanism (having the same configuration as the fourth illustrative embodiment) has a lower rail 58 and a slider 56.

The support member 54 is a flat plate-shaped member (relatively long in the upper-direction of the seat) protruding upwardly from the front part-side of the floor surface FS and is formed at the upper part-side with a long hole 54h. The long hole 54h is a through-hole (a hole portion penetrating in the width direction of the seat) of the support member 54 and is gradually inclined downwards from the rear part towards the front part.

In this illustrative embodiment, the front part-side of the seat cushion 4 is connected to the floor surface FS via the support member 54. At this time, the first connection part 51 is provided with a shaft part A9 protruding in the width direction of the seat, and the shaft part A9 is slidably inserted into the long hole 54h of the support member 54.

Also, the rear part-side of the seat cushion 4 is connected to the floor surface FS via the slide mechanism. At this time, the rear part-side (the second connection part 52) of the seat cushion 4 is rotatably attached to the slider 56 via a rotational shaft A10, so that it can be slid on the lower rail 58.

Figure 7A:
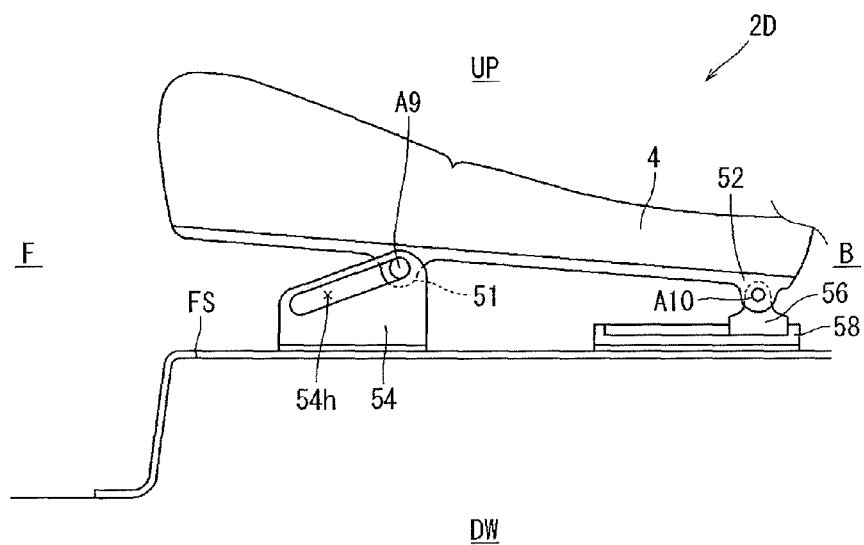

In this illustrative embodiment, at the first state, the first connection part 51 is arranged at the rear part of the long hole 54h and the second connection part 52 is arranged at the rear part-side of the lower rail 58 (see FIG. 7A). At this state, the relative movement of the lower rail 58 and the slider 56 is restrained by the lock mechanism (not shown), so that the seat structure member can be kept at the first state.

In this illustrative embodiment, at the first state, the first connection part 51 is arranged at the rear part (the uppermost part) of the long hole 54h, so that the front part-side of the seat cushion 4 is arranged at a higher position than the rear part-side thereof. In this way, the sitting surface of the seat cushion 4 can be made to be gradually inclined upwardly from the rear of the seat towards the front of the seat, in conformity to the large passenger.

Figure 7B:
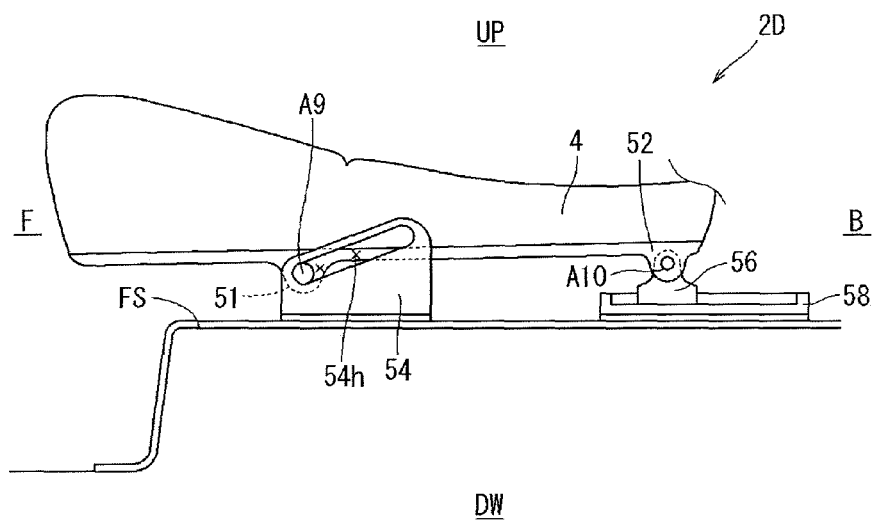

Also, the seat structure member is displaced from the first state to the second state by the connection mechanism (see FIG. 7B). At this time, in this illustrative embodiment, the first connection part 51 is moved to the front part of the long hole 54h and the second connection part 52 is arranged at the front part-side of the lower rail 58. At this state, the relative movement of the lower rail 58 and the slider 56 is restrained by the lock mechanism (not shown), so that the seat structure member can be kept at the second state.

In this illustrative embodiment, at the second state, the first connection part 51 is moved to the front part (the lowermost part) of the long hole 54h. As the first connection part 51 is moved, the seat cushion 4 is rotated about the rear part-side (the rotational shaft A10) serving as a center of rotation, so that the front part of the seat cushion 4 is inclined (moved) downwards, compared to the rear part thereof. In this way, it is possible to set the sitting surface of the seat cushion 4 at a more horizontal state than at the first state.

Therefore, also in this illustrative embodiment, it is possible to effectively change the angle of the sitting surface of the seat cushion 4 in conformity to the state displacement of the vehicle seat 2D.

Sixth Illustrative Embodiment

In this illustrative embodiment, a vehicle seat 2E has substantially the same basic configuration as the vehicle seat 2 of the first illustrative embodiment. Therefore, the common structures are denoted with the same reference numerals and the specific descriptions thereof are omitted.

In this illustrative embodiment, the connection mechanism includes a plurality of connection parts (a first connection part 61 and a second connection part 62), a support member 64, a link arm 63 and an eighth bracket BR8 (refer to FIG. 8).

The first connection part 61 (the flat plate part) is formed to protrude downwardly from the backside (lopsided forwards) of the seat cushion 4, and the second connection part 62 (the flat plate part) is formed to protrude downwardly from the backside of the rear part of the seat cushion 4. Also, the support member 64 is a flat plate-shaped member (relatively long in the upper-direction of the seat) protruding upwardly from the front part-side of the floor surface FS and is formed at the front part-side with a long hole 64h. The long hole 64h is a through-hole (a hole portion penetrating in the width direction of the seat) of the support member 64 and is gradually inclined downwards from the rear part towards the front part.

The link arm 63 is a relatively short I-shaped (when seen from the side) flat plate member. Also, the eighth bracket BR8 is a member protruding upwardly from the rear part of the floor surface FS and is arranged to face the second connection part 62 at the second state.

In this illustrative embodiment, the front part-side of the seat cushion 4 is connected to the floor surface FS via the support member 64. At this time, the first connection part 61 is provided with a shaft part A11 protruding in the width direction of the seat, and the shaft part A11 is slidably inserted into the long hole 64h of the support member 64. Also, the rear part-side of the seat cushion 4 is connected to the floor surface FS via the link arm 63. At this time, an upper end of the link arm 63 is rotatably attached to the second connection part 62 via a rotational shaft A12, and a lower end of the link arm 63 is rotatably attached to the eighth bracket BR8 via a rotational shaft A13. The link arm 63 is tilted rearwards at the first state and is gradually erected as it is displaced to the second state.

Figure 8A:
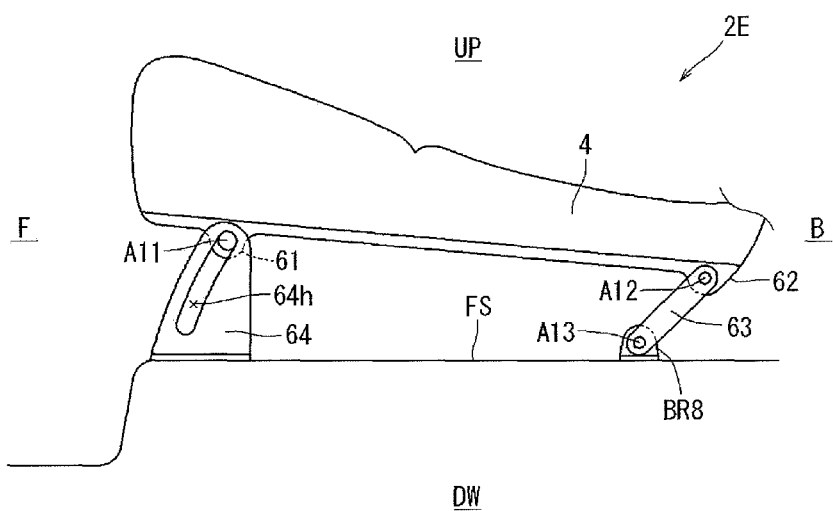

In this illustrative embodiment, at the first state, the first connection part 61 is arranged at the rear part of the long hole 64h and the link arm 63 is tilted rearwards (see FIG. 8A). At this state, the link arm 63 is kept at the rearward tilted posture by the lock mechanism (not shown), so that the seat structure member can be kept at the first state.

At the first state, the first connection part 61 is arranged at the rear part (the uppermost part) of the long hole 64h and the link arm 63 is tilted rearwards, so that the front part-side of the seat cushion 4 is arranged at a higher position that the rear part-side thereof. In this way, the sitting surface of the seat cushion 4 can be gradually inclined upwardly from the rear of the seat towards the front of the seat, in conformity to the large passenger.

Figure 8B:
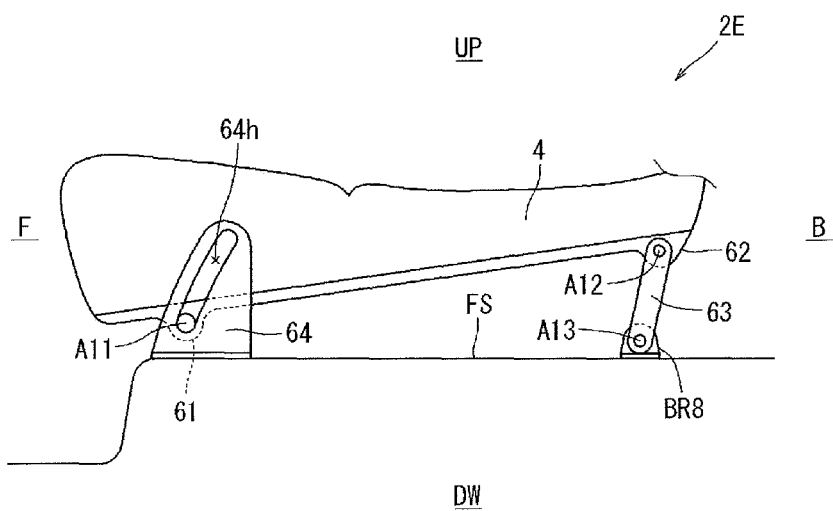

Also, the seat structure member is displaced from the first state to the second state by the connection mechanism (see FIG. 8B). At this time, in this illustrative embodiment, the first connection part 61 is arranged at the front part of the long hole 64h and the link arm 63 is erected. At this state, the link arm 63 is kept at the erected posture by the lock mechanism, so that the seat structure member can be kept at the second state.

In this illustrative embodiment, at the second state, the first connection part 61 is arranged at the front part (the lowermost part) of the long hole 64h, so that the front part of the seat cushion 4 is moved downwardly. Also, the link arm 63 is erected, so that the rear part of the seat cushion 4 is moved upwardly. Therefore, it is possible to set the sitting surface of the seat cushion 4 at a more horizontal state than at the first state.

Therefore, also in this illustrative embodiment, it is possible to effectively change the angle of the sitting surface of the seat cushion 4 in conformity to the state displacement of the vehicle seat 2E.

Seventh Illustrative Embodiment

In this illustrative embodiment, a vehicle seat 2F has substantially the same basic configuration as the vehicle seat 2 of the first illustrative embodiment. Therefore, the common structures are denoted with the same reference numerals and the specific descriptions thereof are omitted.

In this illustrative embodiment, the connection mechanism includes an arm part 71 of the seat cushion 4 and a support member 72 (see FIG. 9).

The arm part 71 is a flat plate-shaped part (having a rectangular shape when seen from the side) and extends from the substantial center of the backside of the seat cushion 4 towards the floor surface FS. A lower end of the arm part 71 has a semicircular shape and a peripheral edge thereof has an irregular shape (a first engaging part 71g is formed). Also, the support member 72 is a substantially rectangular (when seen from the side) flat plate member, and an upper surface part thereof has an irregular shape, so that a second engaging part 72g, which can be engaged with the first engaging part 71g, is formed.

In this illustrative embodiment, the front part-side of the seat cushion 4 is arranged at a slightly higher position than the rear part-side and the seat structure member is arranged at the position of the first state. Also, at this state, the support member 72 is fixed to the floor surface FS while facing the arm part 71.

At a state where the arm part 71 is gradually inclined rearwards from the lower towards the upper, a lower end (the first engaging part 71g) of the arm part 71 is engaged with the upper surface (the second engaging part 72g) of the support member 72. As the arm part 71 is displaced from the first state to the second state, it is gradually tilted forwards (a posture gradually tilted forwards as the arm part faces upward).

Figure 9A:
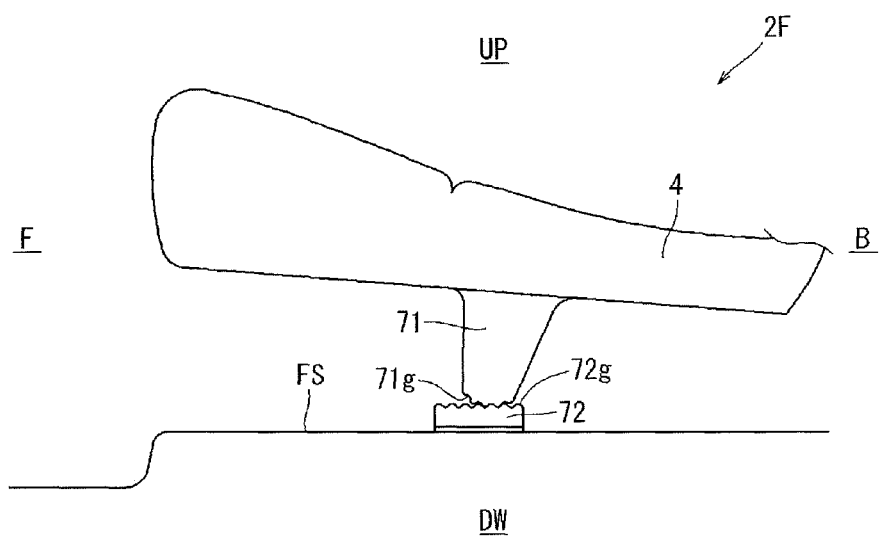

Referring to FIG. 9A, the arm part 71 is kept at the rearward tilted posture by the lock mechanism (not shown), so that the seat structure member is set at the first state. At this state, the sitting surface of the seat cushion 4 is gradually inclined upwards from the rear of the seat towards the front of the seat, in conformity to the large passenger.

Figure 9B:
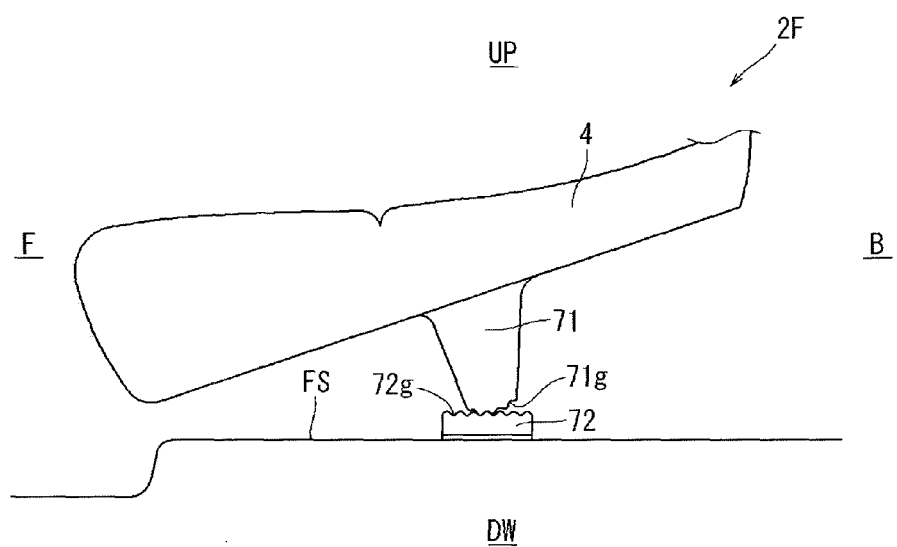

Then, referring to FIG. 9B, the seat structure member is displaced from the first state to the second state by the connection mechanism. At this time, in this illustrative embodiment, the arm part 71 is rotated in a pendulum form and is thus set at the forward tilted posture while the first engaging part 71g is engaged with the second engaging part 72g. The arm part 71 is kept at the forward tilted posture by the lock mechanism (not shown), so that the seat structure member can be displaced to the second state. In this illustrative embodiment, as the arm part 71 is tilted forwards, the front part of the seat cushion 4 is inclined (moved) downwardly and the rear part of the seat cushion 4 is inclined (moved) upwardly. Therefore, it is possible to set the sitting surface of the seat cushion 4 at a more horizontal state than at the first state, in conformity to the small passenger.

In this way, also in this illustrative embodiment, it is possible to effectively change the angle of the sitting surface of the seat cushion 4 in conformity to the state displacement of the vehicle seat 2F by the pendulum operation of the arm part 71 (a relatively simple configuration).

Eighth Illustrative Embodiment

In this illustrative embodiment, a vehicle seat 2G has substantially the same basic configuration as the vehicle seat 2 of the first illustrative embodiment. Therefore, the common structures are denoted with the corresponding reference numerals and the specific descriptions thereof are omitted.

In this illustrative embodiment, the connection mechanism includes a slide mechanism 82, 83, a connection part 81 and a support member 84 (see FIG. 10).

The slide mechanism 82, 83 has an upper rail 82 and a lower rail 83. The upper rail 82 is attached to a backside of the seat cushion 4 and the lower rail 83 is attached to a ninth bracket BR9 connected to the floor surface FS so that it can be rotated in longitudinal direction about a rotational shaft A14. The support member 84 is a flat plate-shaped member (relatively long in the vertical direction of the seat) protruding upwardly at the rear-side of the floor surface FS, and is formed with a long hole 84h from the upper thereof to the lower. The long hole 84h is a through-hole (a hole portion penetrating in the width direction of the seat) of the support member 84 and is gradually inclined downwards from a front part thereof towards a rear part.

In this illustrative embodiment, the front-side of the seat cushion 4 is connected to the floor surface FS through the slide mechanism 82, 83. At this time, since the lower rail 83 is attached to the ninth bracket BR9 so that it can be rotated in longitudinal direction about the rotational shaft A14, the upper rail 82 slides on the lower rail 83 together with the seat cushion 4 and can be rotated in the longitudinal direction together with the lower rail 83.

Also, the rear-side of the seat cushion 4 is connected to the floor surface FS through the support member 84. At this time, the connection part 81 is provided with a shaft part A15 protruding in the width direction of the seat and the shaft part A15 is slidably inserted into the long hole 84h of the support member 84.

Figure 10A:
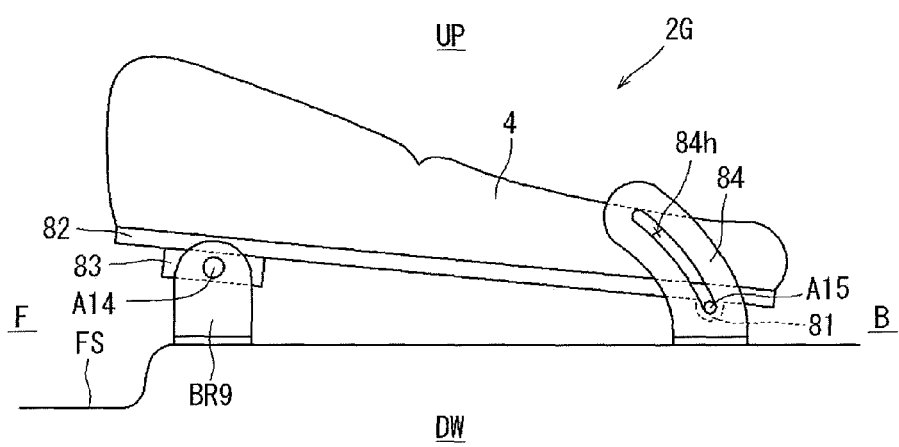

In this illustrative embodiment, at the first state, the shaft part A15 of the connection part 81 is arranged at the rear part of the long hole 84h and a front end portion of the upper rail 82 is arranged in the vicinity of a front end portion of the lower rail 83 (see FIG. 10A). At this state, the relative movement between the lower rail 83 and the upper rail 82 is restrained by the locking mechanism (not shown), so that the seat structure member can be kept at the first state.

In this illustrative embodiment, at the first state, the shaft part A15 of the connection part 81 is arranged at the rear part (the lowest part) of the long hole 84h, so that the front-side of the seat cushion 4 is arranged at a higher position than the rear-side thereof. In this way, the sitting surface of the seat cushion 4 can be made to be gradually inclined upwards from the rear of the seat towards the front of the seat, in conformity to the large passenger.

Figure 10B:
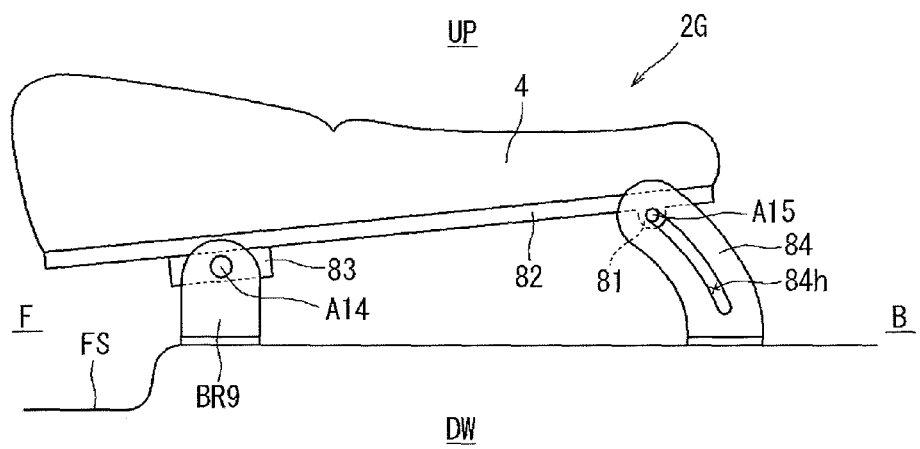

Also, the seat structure member is displaced from the first state to the second state by the connection mechanism (see FIG. 10B). At this time, in this illustrative embodiment, while the connection part 81 is moved towards the front part of the long hole 84h, the front end portion of the upper rail 82 is arranged at a position distant forwards from the front end portion of the lower rail 83. At this state, the relative movement between the lower rail 83 and the upper rail 82 is restrained by the locking mechanism (not shown), so that the seat structure member can be kept at the second state.

In this illustrative embodiment, at the second state, the shaft part 15A of the connection part 81 is moved to the front part (the uppermost part) of the long hole 84h. As the shaft part 15A of the connection part 81 is moved, the rear-side of the seat cushion 4 is raised and the front-side thereof is moved forwards and is rotated in the longitudinal direction about the rotational shaft A14 together with the lower rail 83, so that the front part of the seat cushion 4 is inclined (moved) more downwardly than the rear part thereof. In this way, it is possible to set the sitting surface of the seat cushion 4 at a more horizontal state than at the first state.

Therefore, also in this illustrative embodiment, it is possible to effectively change the angle of the sitting surface of the seat cushion 4 in conformity to the state displacement of the vehicle seat 2G.

Ninth Illustrative Embodiment

In this illustrative embodiment, a vehicle seat 2H has substantially the same basic configuration as the vehicle seat 2 of the first illustrative embodiment. Therefore, the common structures are denoted with the corresponding reference numerals and the specific descriptions thereof are omitted.

In this illustrative embodiment, the connection mechanism has a plurality of connection parts (a first connection part 91 and a second connection part 92), a plurality of link members (a first link arm 93, a second link arm 94 and a third link arm 97), a slide mechanism (a lower rail 95 and an upper rail 96) and brackets BR10, BR11 (see FIG. 11).

The first connection part 91 (the flat plate part) is formed to protrude downwardly from the backside (in the vicinity of the front part) of the seat cushion 4, and the second connection part 92 (the flat plate part) is formed to protrude downwardly from the backside of the rear part of the seat cushion 4. The lower rail 95 of the slide mechanism extends in the longitudinal direction, and a front end portion thereof is supported to the floor surface FS by the bracket BR10 and a rear end portion thereof is supported to the floor surface FS by the bracket BR11. The upper rail 96 of the slide mechanism extends in the longitudinal direction and is assembled to slide relative to the lower rail 95 in the longitudinal direction.

The first link arm 93 is an I-shaped (when seen from the side) flat plate member, and an upper end thereof is rotatably attached to the first connection part 91 through a rotational shaft A16 and a lower end thereof is rotatably attached to a front end portion of the upper rail 96 through a rotational shaft A18. The third link arm 97 is a substantially arc-shaped (when seen from the side) flat plate member and is formed with an arc-shaped long hole 97h at a central portion thereof. The long hole 97h is a through-hole (a hole portion penetrating in the width direction of the seat) of the third link arm 97 and has a shape conforming to the arc-shaped outward appearance of the third link arm 97 (when seen from the side). A rear end portion of the third link arm 97 is rotatably attached to a rear end portion of the upper rail 96 through a rotational shaft A20. In the long hole 97h, a shaft part A21 provided for the lower rail 95 and protruding in the width direction of the seat is inserted. A rotational shaft A19 protruding in the width direction of the seat is mounted at a front-upper part of the third link arm 97. The second link arm 94 is an I-shaped (when seen from the side) flat plate member, and an upper end thereof is rotatably attached to the second connection part 92 through a rotational shaft A17 and a lower end thereof is rotatably attached to the third link arm 97 through a rotational shaft A19.

Figure 11A:
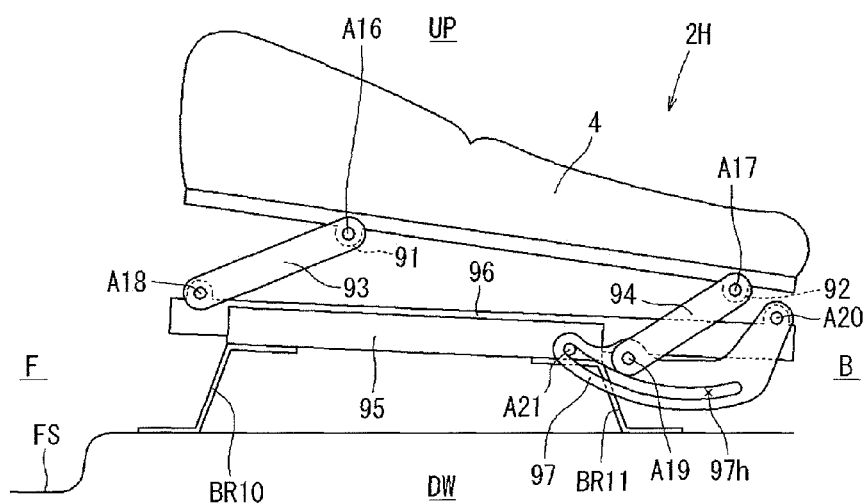

In this illustrative embodiment, at the first state, the first link arm 93 is tilted rearwards and the shaft part A21 is arranged at a front part of the long hole 97h of the third link arm 97, so that the third link arm 97 is arranged at the lowest position and the second link arm 94 is tilted rearwards in the same degree as the first link arm 93 (see FIG. 11A). That is, the first link arm 93 and the second link arm 94 are substantially parallel with each other. At this state, the first link arm 93 is kept at the rearward tilted posture by the lock mechanism (not shown), so that the seat structure member can be kept at the first state.

In this illustrative embodiment, at the first state, the third link arm 97 is arranged at the lowest position, so that the second link arm 94 is tilted rearwards in the same degree as the first link arm 93 and the front part-side of the seat cushion 4 is arranged at a higher position than the rear part-side. In this way, the sitting surface of the seat cushion 4 can be made to be gradually inclined upwardly from the rear of the seat towards the front of the seat, in conformity to the large passenger. Here, the first link arm 93 may be tilted forwards, as required. In this case, the attaching positions of the first link arm to the backside of the seat cushion 4 and to the upper rail 96 are appropriately changed.

Figure 11B:
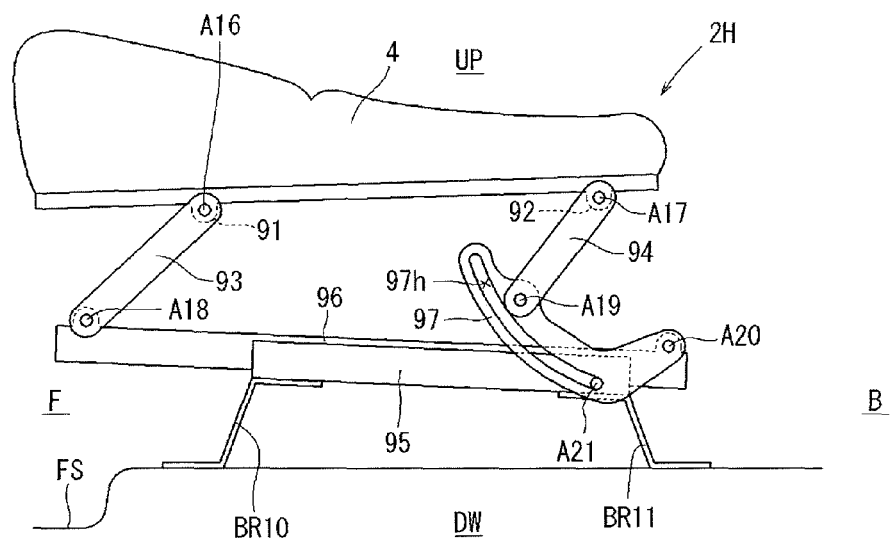

Also, the seat structure member is displaced from the first state to the second state by the connection mechanism (see FIG. 11B). That is, the upper rail 96 is moved forwards relative to the lower rail 95. At this time, in this illustrative embodiment, the shaft part A21 slides in the long hole 97h of the third link arm 97 and reaches the rear part of the long hole 97h. Actually, since the shaft part A21 is fixed to the lower rail 95, the third link arm 97 is rotated upwardly about the rotational shaft A20 and is thus arranged at the uppermost part. At this time, the second link arm 94 is rotated (in the direction of reducing the rearward tilted degree) so as to raise the rearward tilted posture thereof and the first link arm 93 keeps the rearward tilted posture thereof at the same degree as the first state. At this state, the first link arm 93 is kept at the rearward tilted posture by the lock mechanism (not shown), so that the seat structure member can be kept at the second state.

In this illustrative embodiment, at the second state, the third link arm 97 is arranged at the uppermost part, so that the second link arm 94 is moved to the rearward tilted posture closer to the erected posture than the first link arm 93 and the front part-side of the seat cushion 4 is tilted (moved) more downwardly than the rear part-side thereof. In this way, it is possible to set the sitting surface of the seat cushion 4 at a more horizontal state than at the first state.

Therefore, also in this illustrative embodiment, it is possible to effectively change the angle of the sitting surface of the seat cushion 4 in conformity to the state displacement of the vehicle seat 2H.

Tenth Illustrative Embodiment

In this illustrative embodiment, a vehicle seat 2J includes a lifter mechanism 100L (a first lifter link member 103 and a second lifter link member 104) (refer to FIG. 12), in addition to the connection mechanism 80L (the slide mechanism 82, 83, the connection part 81 and the support member 84) of the vehicle seat 2G of the eighth illustrative embodiment. The common structures to the vehicle seat 2G of the eighth illustrative embodiment are denoted with the corresponding reference numerals and the specific descriptions thereof are omitted.

Figure 12A:
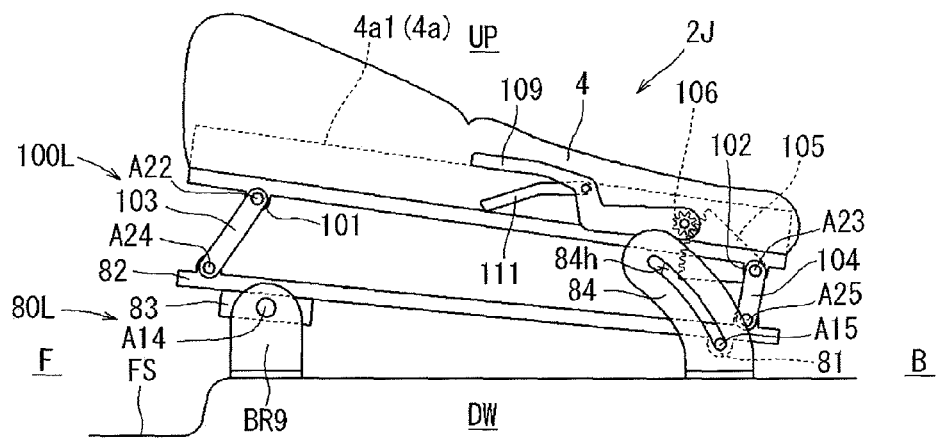
Figure 12B:
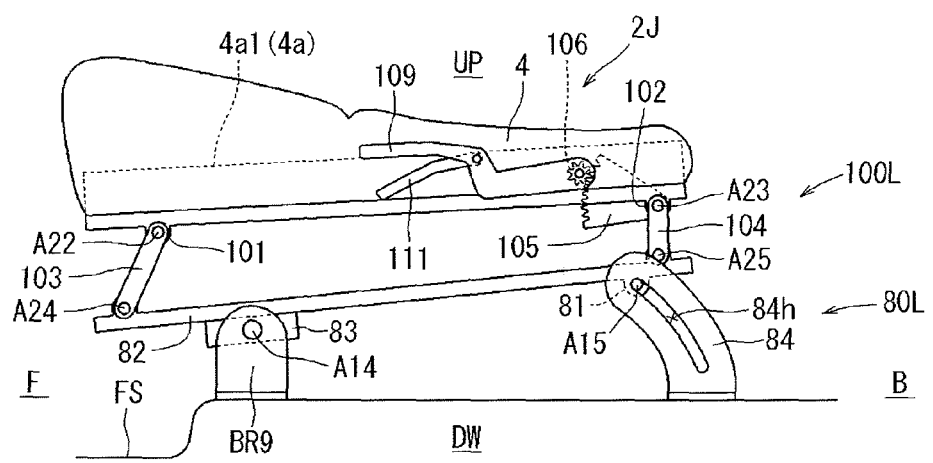
Figure 14:
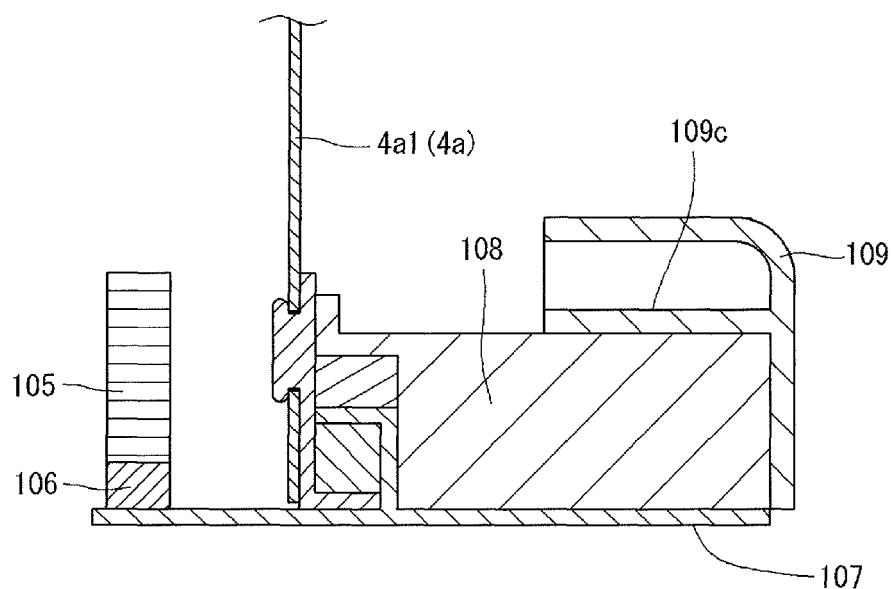
FIG. 14 is a sectional view taken along a line XIV-XIV of FIG. 12C.
Figure 14:
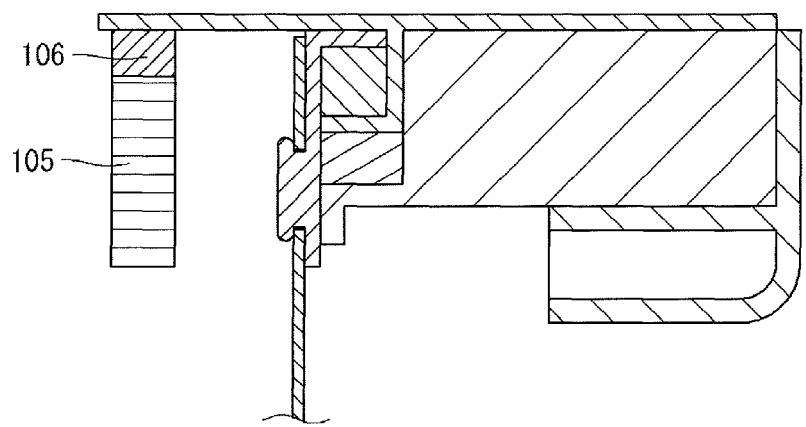

The lifter mechanism 100L is described. As shown in FIGS. 12 and 14, the seat cushion 4 is provided with a cushion frame 4a forming a skeleton thereof. Two rectangular side frames 4a1, which are press-components, are arranged so that a long-side direction of the cushion frame 4a extends in the longitudinal direction and a short-side direction thereof extends in the vertical direction. Then, the front and rear end portions of the side frames are connected with a front pipe (not shown) and a rear pipe (not shown), so that a rectangular frame shape is made as seen from the plan view. First connection parts 101 (flat plate parts) protrude downwardly from lower surfaces in the vicinity of front parts of both side frames 4a1, and second connection parts 102 (flat plate parts) protrude downwardly from lower surfaces in the vicinity of rear parts of both side frames 4a1.

The first lifter link member 103 is an I-shaped (when seen from the side) flat plate member, and an upper end thereof is rotatably attached to the first connection part 101 through a rotational shaft A22 and a lower end thereof is rotatably attached to a front end portion of the upper rail 82 through a rotational shaft A24. The second lifter link member 104 is an I-shaped (when seen from the side) flat plate member, and an upper end thereof is rotatably attached to the second connection part 102 through a rotational shaft A23 and a lower end thereof is rotatably attached to a rear end portion of the upper rail 82 through a rotational shaft A25. At both left and right sides, the second lifter member 104 is fixed and connected to the rotational shaft A23, and main parts of fan-shaped and plate-shaped sector gear 103 are fixed and connected to the rotational shaft A23. An arc part of the sector gear 105 is formed with teeth and is meshed with a pinion gear 106 rotatably supported to the side frame 4a1. When the pinion gear 106 is rotated, the sector gear 105 is rotated and the second lifter link member 104 is thus rotated through rotation of the rotational shaft A23. In this illustrative embodiment, the first lifter link member 103 is formed to be relatively longer than the second lifter link member 104. This is to make a vertically moving range of the front end portion of the seat cushion 4 larger than that of the rear end portion thereof. However, it is possible to freely adjust the lengths of the first lifter link member 103 and second lifter link member 104, as required.

Figure 13:
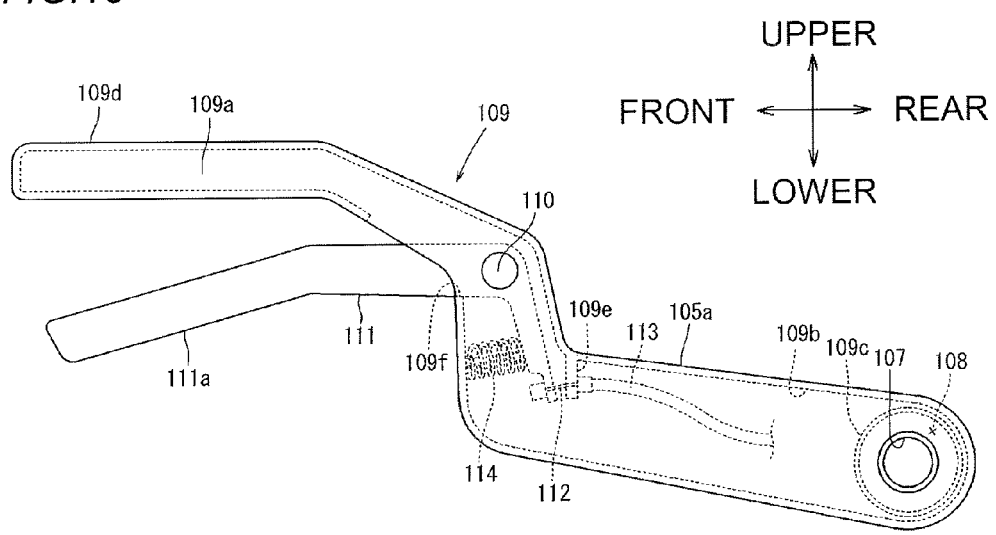
FIG. 13 is a side view of an operating member of a connection mechanism and a lifter mechanism of the vehicle seat according to the tenth illustrative embodiment.

As shown in FIG. 14, the pinion gear 106 is coupled to an output shaft 107, and the output shaft 107 is rotatably supported to the side frame 4a1. An outer side of the output shaft 107 in the width direction of the seat with respect to the side frame 4a1 is attached with a lifter mechanism operating lever 109 through a driving unit 108 having a cylindrical brake. As shown in FIG. 13, the lifter mechanism operating lever 109 is a member in which a standing-wall 109b is arranged at an outer periphery of a strip-shaped plate part 109a bent in a crank shape when seen from the side, towards in the inward direction of the seat. One end of the plate part 109a in a long-side direction thereof is provided with a circular ring-shaped fitting part 109c that is fitted with an outer periphery of the driving unit 108 having a brake and is erected coaxially with the output shaft 107 and in the same direction as the standing-wall 109b. Also, the standing-wall 109b is removed at a part corresponding to an operating part of a connection mechanism lock releasing/closing lever 111

(which will be described later) not to interfere with an operation of the connection mechanism lock releasing/closing lever 111. The other end of the plate part 109a in the long-side direction thereof is narrowed in a short-side direction to form a grip part 109d. A seat cover, a seal and the like are actually interposed between the side frame 4a1 and the lifter mechanism operating lever 109, although they are not shown in FIG. 14.

At a usual state of the lifter mechanism operating lever 109 before the grip part 109d is pulled up or pushed down, the driving unit 108 having a brake holds the lifter mechanism operating lever 109 at a neutral position and applies a brake force to the output shaft 107 so that the output shaft 107 is not rotated. When the lifter mechanism operating lever 109 is rotation-operated in any of the above directions and the rotational force is applied to the driving unit 108 having a brake, the driving unit 108 having a brake increases the rotational force to apply torque so that a high rotating output is applied to the output shaft 107 with a low force. Also, when returning the lifter mechanism operating lever 109 from the operated position to the original neutral position, the driving unit 108 having a brake idles the operation so that the output shaft 107 is not rotated by the rotating operation. Here, the side frame 4a1, the first lifter link member 103, the upper rail 82 and the second lifter link member 104 configure a four-joint link mechanism. In the four-joint link mechanism, when the second lifter link member 104 is rotated relative to the upper rail 82, the first lifter link member 103 is also moved to follow the rotating movement and an interval between the upper rail 82 and the side frame 4a1 is changed. Thereby, the grip part 109d of the lifter mechanism operating lever 109 is pushed up or pushed down, so that the seat cushion 4 can be vertically moved relative to the upper rail 82 through the rotations of the output shaft 107, the pinion gear 106, the sector gear 105 and the second lifter link member 104. At a state where the vertical position of the seat cushion 4 relative to the upper rail 82 is appropriately set, the lifter mechanism operating lever 109 is kept at the neutral position to stop the movement of the seat cushion 4 at the corresponding position.

Figure 12C:
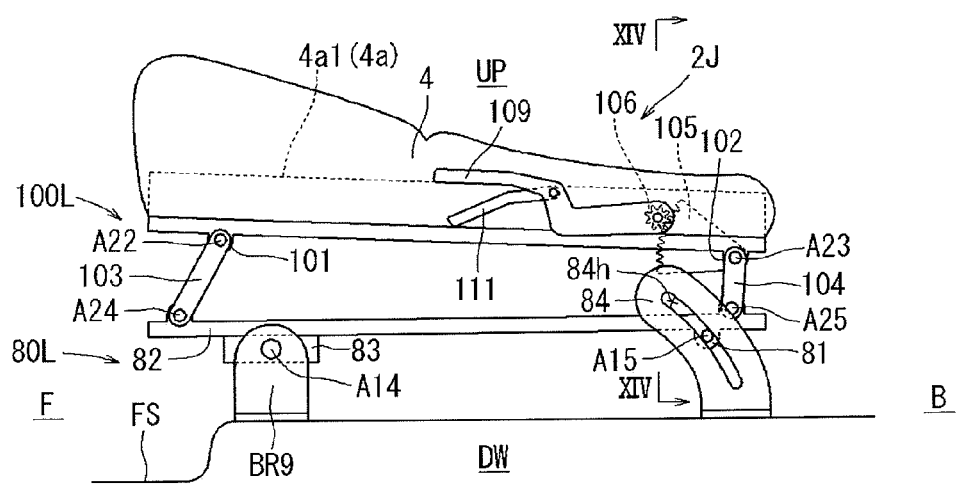

Also, as shown in FIG. 13, a central bent part of the lifter mechanism operating lever 109 is provided with a lever rotating shaft 110 to be erected in the same direction as the standing-wall 109b, which rotatably supports the connection mechanism lock releasing/closing lever 111 for releasing/closing the lock of the connection mechanism 80L relative to the lifter mechanism operating lever 109. The connection mechanism lock releasing/closing lever 111 is an L-shaped plate-shaped member, when seen from the side, is rotatably supported to the lever rotating shaft 110 at the bent part thereof and is provided with a grip part 111a at an end portion of a long-side arm part. The grip part 111a is covered with a cover member made of a resin and is configured so that when a passenger grips the grip part, the passenger does not feel painful due to an excessively small touch area with a hand. An end portion of a cable 112 connected to the lock mechanism of the connection mechanism 80L is caught and fixed to an end portion of a short-side arm part of the connection mechanism lock releasing/closing lever 111. Also, an extending-mounted standing-wall part 109e is mounted from the standing-wall 109b of the lifter mechanism operating lever 109 in the vicinity of the end portion of the short-side arm part of the connection mechanism lock releasing/closing lever 111 towards a center of the short-side direction of the plate part 109a, and an end portion of a covering 113 of the cable 112 is caught and fixed thereto. The other end portion of the covering 113 is caught and fixed in the vicinity of the lock mechanism of the connection mechanism 80L. In FIG. 13, a spring member 114 urging in an extension direction is provided between a front-side of the short-side arm part of the connection mechanism lock releasing/closing lever 111 and a rear side of the standing-wall 109b of the lifter mechanism operating lever 109. Thereby, at a usual state, the connection mechanism lock releasing/closing lever 111 is pressed in a direction (a counterclockwise direction in FIG. 13) getting away from the grip part 109d of the lifter mechanism operating lever 109 and is contacted to an end portion 109f of the removed part of the standing-wall 109b, so that the rotation thereof is stopped. At this state, the connection mechanism 80L is kept at a locked state. When the grip part 109d of the lifter mechanism operating lever 109 and the grip part 111a of the connection mechanism lock releasing/closing lever 111 are gripped at the same time and are thus brought close to each other, the cable 112 is pulled and the lock mechanism of the connection mechanism 80L is thus released. A pressing means (not shown) is provided which enables the upper rail 83 to reach a position (a position at which the shaft part A15 is located at an intermediate part of the long hole 84h of the support member 84) parallel with the floor surface FS, as shown in FIG. 12C, when the lock mechanism of the connection mechanism 80L is released. Thereby, it is convenient to adjust an optimal sitting position by operating the lifter mechanism 100L while moving forwards and rearwards the seat cushion 4 at a state where the connection mechanism 80L is free. However, the initial position of the connection mechanism 80L can be appropriately selected between the first state and the second state.

That is, the vehicle seat 2J of this illustrative embodiment is configured so that the four-joint link mechanism having the side frames 4a1, the first lifter link member 103, the upper rail 82 and the second lifter link member 104 is put on the connection mechanism of the vehicle seat 2G of the eighth illustrative embodiment.

In this illustrative embodiment, a method of adjusting the vertical position and angle of the sitting surface of the seat cushion 4 in conformity to the state displacement of the vehicle seat 2J is described. At a state where the passenger sits on the seat, the passenger grips the grip part 109d of the lifter mechanism operating lever 109 and the grip part 111a of the connection mechanism lock releasing/closing lever 111 at the same time. Thereby, the connection mechanism 80L is moved to the initial position shown in FIG. 12C. At this state, the passenger adjusts the position of the upper rail 82 relative to the lower rail 83 in the longitudinal direction while moving the hips in the longitudinal direction, and finds out an optimal position with respect to the longitudinal direction and vertical directions and the angle of the sitting surface by operating the lifter mechanism 100L. Specifically, while moving the connection mechanism 80L, the passenger operates the lifter mechanism operating lever 109 at a state where the connection mechanism lock releasing/closing lever 111 is moved relative to the lifter mechanism operating lever 109 (at a state where the lock mechanism of the connection mechanism 80L is free). When an optimal position is found out, the passenger disengages a hand from the grip part 111a of the connection mechanism lock releasing/closing lever 111 and holds the lifter mechanism operating lever 109 at the neutral position. Thereby, the connection mechanism 80L and the lifter mechanism 100L are respectively locked, so that the position of the seat cushion 4 is fixed. As a result, a combination of the longitudinal position, the vertical position and the angle of the sitting surface of the seat cushion 4, which cannot be obtained only by the operation of the connection mechanism 80L, is obtained, so that a degree of freedom of the adjustment is increased.

Also, the combination of the connection mechanism 80L and the lifter mechanism 100L can be also applied to the vehicle seat 2 of the first illustrative embodiment, the vehicle seat 2A of the second illustrative embodiment, the vehicle seat 2B of the third illustrative embodiment, the vehicle seat 2C of the fourth illustrative embodiment, the vehicle seat 2D of the fifth illustrative embodiment, the vehicle seat 2E of the sixth illustrative embodiment, the vehicle seat 2F of the seventh illustrative embodiment and the vehicle seat 2H of the ninth illustrative embodiment, in the same manner as the vehicle seat 2F of the eighth illustrative embodiment. That is, when the lifter mechanism 100L is combined with the respective connection mechanisms of the first to seventh and night illustrative embodiments, it is possible to realize the same operational effects as the vehicle seat 2J of this illustrative embodiment. At this time, when arranging the lifter mechanism 100L between each connection mechanism and the seat cushion 4, if a frame member corresponding to the upper rail 82 of the vehicle seat 2G of the eighth illustrative embodiment is required, the corresponding member is additionally provided and arranged.

The vehicle seat of the present invention is not limited to the above illustrative embodiments and can adopt the other various illustrative embodiments. (1) In the first to ninth illustrative embodiments of the illustrative embodiments, at the first state, the entire seat cushion is arranged with being inclined relative to the horizontal state (the front part faces upwards and the rear part faces downwards). However, at the first state, the seat cushion may be horizontally arranged and only the sitting surface may be set at an inclination angle adapted to the large passenger. (2) Also, in the first to ninth illustrative embodiments of the illustrative embodiments, the vehicle seat is arranged in the rear of the instrument panel. However, the vehicle seat may be arranged in the rear of other various members such as another vehicle seat. Also, in the above illustrative embodiments, the connection mechanism is attached to the floor surface. However, the connection mechanism may be attached to a variety of interior structures such as a vehicle interior wall, and the configurations of the respective brackets can be also appropriately changed. (3) Also, in the first to ninth illustrative embodiments of the illustrative embodiments, the connection mechanism can be locked at any position between the first state and the second state by the lock mechanism. (4) In the tenth illustrative embodiment of the illustrative embodiments, when the grip part 109d of the lifter mechanism operating lever 109 and the grip part 111a of the connection mechanism lock releasing/closing lever 111 are gripped at the same time and are thus brought close to each other, the lock mechanism of the connection mechanism 80L is thus released. However, the present invention is not limited thereto. For example, at a usual lock-released state, when the grip part 109d of the lifter mechanism operating lever 109 and the grip part 111a of the connection mechanism lock releasing/closing lever 111 are gripped at the same time and are thus brought close to each other, the lock mechanism of the connection mechanism 80L may be locked. However, according to the latter configuration, a mechanism for holding the state where the grip part 109d of the lifter mechanism operating lever 109 and the grip part 111a of the connection mechanism lock releasing/closing lever 111 are brought close to each other is required. Further, when operating the lifter mechanism, the passenger has only to operate the lifter mechanism operating lever 109 without gripping the grip part 111a of the connection mechanism lock releasing/closing lever 111. (5) In the tenth illustrative embodiment of the illustrative embodiments, the four-joint link mechanism is used as the lifter mechanism. However, the present invention is not limited thereto. For example, a mechanism capable of independently vertically adjusting the front and rear parts of the seat cushion 4 may be adopted. However, at this time, there may be cases where the lifter mechanism operating lever 109 and the connection mechanism lock releasing/closing lever 111 can not be adopted as they are. (6) The configurations of the above illustrative embodiments can be applied to the various vehicle seats of a vehicle, an airplane, a train and the like. Meanwhile, in the above illustrative embodiments, the configuration of the vehicle seat has been exemplified. However, the configuration of the vehicle seat can be appropriately changed (for example, the headrest can be omitted).

The present invention provides illustrative, non-limiting aspects as follows:

(1) In a first aspect, there is provided a vehicle seat including: a connection mechanism; a seat cushion connected to an interior structure of a vehicle via the connection mechanism and configured to be displaced between: a first state; and a second state at which the seat cushion is arranged at a position closer to a front part-side of the vehicle than at the first state; and a seat back erectably connected to the seat cushion, wherein a sitting surface of the seat cushion at the first state gradually inclines upwardly from the rear of the seat towards the front of the seat, and wherein the connection mechanism is configured to displace the seat cushion to the second state and move a front part-side of the seat cushion more downwardly than at the first state, whereby the sitting surface of the seat cushion is made more horizontal at the second state than at the first state.

Accordingly, at the first state, the sitting surface is gradually inclined upwardly from the rear of the seat towards the front of the seat by the connection mechanism. Thereby, it is possible to adapt an angle of the sitting surface at the first state to a relatively large passenger. Also, at the second state, the sitting surface is made more horizontal than at the first state. Thereby, it is possible to adapt the angle of the sitting surface at the second state to a relatively small passenger.

(2) In a second aspect, there is provided the vehicle seat according to the first aspect, wherein a lifter mechanism having a vertical adjustment function is provided between the seat cushion and the connection mechanism.

Accordingly, since the lifter mechanism having a vertical adjustment function is provided in addition to the connection mechanism, it is possible to effectively change the angle of the sitting surface of the seat cushion in conformity to the state displacement of the vehicle seat with more precision by a mutual adjustment of the connection mechanism and the lifter mechanism.

(3) In a third aspect, there is provided the vehicle seat according to the second aspect, wherein the lifter mechanism is configured as a four-joint link including the seat cushion, the connection mechanism, a first lifter link member and a second lifter link member, wherein the first lifter link member is rotatably connected to a front part of the seat cushion and a front part of the connection mechanism, respectively, and wherein the second lifter link member is rotatably connected to a rear part of the seat cushion and a rear part of the connection mechanism, respectively.

Accordingly, since the lifter mechanism is configured as the four-joint link, it is possible to effectively change the angle of the sitting surface of the seat cushion in conformity to the state displacement of the vehicle seat with more precision by the simple structure.

(4) In a fourth aspect, there is provided the vehicle seat according to the second or third aspect, wherein a lock releasing/closing member of the connection mechanism is integrated with a vertical adjustment operating member of the lifter mechanism so that a passenger can operate the lock releasing/closing member and the vertical adjustment operating member at the same time with one hand, and wherein a vertical adjustment operation of the lifter mechanism can be performed at a state where the connection mechanism is lock-released.

Accordingly, since the passenger can operate the connection mechanism and the lifter mechanism at the same time with one hand, it is possible to change the longitudinal position, the vertical position and the angle of the sitting surface of the seat cushion more conveniently.

What is claimed is:

1. A vehicle seat comprising:
   a connection mechanism;
   a seat cushion connected to an interior structure of a vehicle via the connection mechanism and configured to be displaced between:
      a first sitting position; and
      a second sitting position at which the seat cushion is arranged at a position closer to a front part-side of the vehicle than at the first sitting position; and
   a seat back erectably connected to the seat cushion, wherein
   a sitting surface of the seat cushion at the first sitting position forms a gradual upward incline from a rear of the vehicle seat towards a front of the vehicle seat,
   the connection mechanism is configured to displace the seat cushion to the second sitting position and move a front part-side of the seat cushion more downwardly than at the first sitting position, whereby the sitting surface of the seat cushion is made more horizontal at the second sitting position than at the first sitting position,
   the connection mechanism is lockable in each of the first sitting position and the second sitting position so as to maintain a sitting position of the vehicle seat relative to the interior structure of the vehicle,
   a lifter mechanism having a vertical adjustment function is provided between the seat cushion and the connection mechanism,
   the lifter mechanism is configured as a four-joint link including the seat cushion, the connection mechanism, a first lifter link member, and a second lifter link member,
   the first lifter link member is rotatably connected to a front part of the seat cushion and a front part of the connection mechanism, respectively,
   the second lifter link member is rotatably connected to a rear part of the seat cushion and a rear part of the connection mechanism, respectively, and
   the connection mechanism is configured to displace the seat cushion from the first sitting position to the second sitting position independently of any rotatable movement of the first lifter link member and the second lifter link member.

2. The vehicle seat according to claim 1, wherein
   a lock releasing/closing member of the connection mechanism is integrated with a vertical adjustment operating member of the lifter mechanism so that the lock releasing/closing member and the vertical adjustment operating member are operable at the same time with a single actuation movement, and
   a vertical adjustment operation of the lifter mechanism can be performed at a state where the connection mechanism is lock-released.

* * * * *